United States Patent
Mueller et al.

(10) Patent No.: US 12,212,472 B2
(45) Date of Patent: Jan. 28, 2025

(54) SYSTEM AND METHOD FOR ADAPTIVELY AND DYNAMICALLY SCALING WIRELESS COMMUNICATION ENTERPRISE NETWORK INFRASTRUCTURE

(71) Applicant: Dell Products, LP, Round Rock, TX (US)

(72) Inventors: Julius Mueller, Santa Cruz, CA (US); Liam B. Quinn, Austin, TX (US); Suresh K. Ramasamy, Cedar Park, TX (US); Abeye Teshome, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 572 days.

(21) Appl. No.: 17/502,529

(22) Filed: Oct. 15, 2021

(65) Prior Publication Data
US 2023/0121268 A1     Apr. 20, 2023

(51) Int. Cl.
*H04L 41/16*      (2022.01)
*H04L 41/0893*    (2022.01)
(Continued)

(52) U.S. Cl.
CPC .......... *H04L 41/16* (2013.01); *H04L 41/0893* (2013.01); *H04L 41/0896* (2013.01); *H04W 28/0268* (2013.01)

(58) Field of Classification Search
CPC .......... H04L 41/0896; H04W 28/0268; H04W 28/084
See application file for complete search history.

(56) References Cited

U.S. PATENT DOCUMENTS

| | | | |
|---|---|---|---|
| 2018/0006954 A1* | 1/2018 | Arora | H04W 28/08 |
| 2019/0166518 A1* | 5/2019 | Arora | H04W 48/06 |

OTHER PUBLICATIONS

P. Mach and Z. Becvar, "Mobile Edge Computing: A Survey on Architecture and Computation Offloading," in IEEE Communications Surveys & Tutorials, vol. 19, No. 3, pp. 1628-1656, thirdquarter 2017, doi: 10.1109/COMST.2017.2682318. (Year: 2017).*

* cited by examiner

*Primary Examiner* — Gary Mui
*Assistant Examiner* — Yewon Kim
(74) *Attorney, Agent, or Firm* — Prol Intellectual Property Law, PLLC; H. Kenneth Prol

(57) ABSTRACT

A method of adaptively adjusting infrastructure of an enterprise mobile network may comprise inputting into a neural network performance metrics and performance requirements describing a performance gap between processing capabilities and requirements at an enterprise mobile network comprising a Multi-Access Edge Computing platform, Radio Access Networks, cellular network cores, and non-cellular access points, connectivity metrics and requirements describing a connectivity gap between measured and required minimum Quality of Service values for wireless links between a pool of user equipment devices (UEs), and the enterprise mobile network, outputting an adjusted infrastructure component configuration and an adjusted internetwork connectivity configuration predicted to minimize the performance gap and the connectivity gap, adjusting a distribution of computing resources across the enterprise mobile network, according to the adjusted infrastructure component configuration, and adjusting a distribution of communication traffic across the pool of UEs, and the enterprise mobile network, according to the adjusted internetwork connectivity configuration.

20 Claims, 9 Drawing Sheets

(51) Int. Cl.
*H04L 41/0896* (2022.01)
*H04W 28/02* (2009.01)

SYSTEM AND METHOD FOR ADAPTIVELY AND DYNAMICALLY SCALING WIRELESS COMMUNICATION ENTERPRISE NETWORK INFRASTRUCTURE

FIELD OF THE DISCLOSURE

The present disclosure generally relates to wireless communication for user equipment devices (UEs) such as mobile computers or smartphones within enterprise mobile networks. More particularly, the present disclosure relates to adaptively and dynamically scaling up or scaling down infrastructure components for particular wireless communication standards to provide the type of wireless communication coverage or remote compute and storage requested by a plurality of UEs communicating via an enterprise mobile network at any given time.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems remotely available at edge compute locations or elsewhere in a network to a user equipment (UE) device. The information handling system may include telecommunication, network communication, and video communication capabilities. Various components of the information handling system may be scaled up or down dynamically by adjusting resources dedicated to operation of such components over time.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
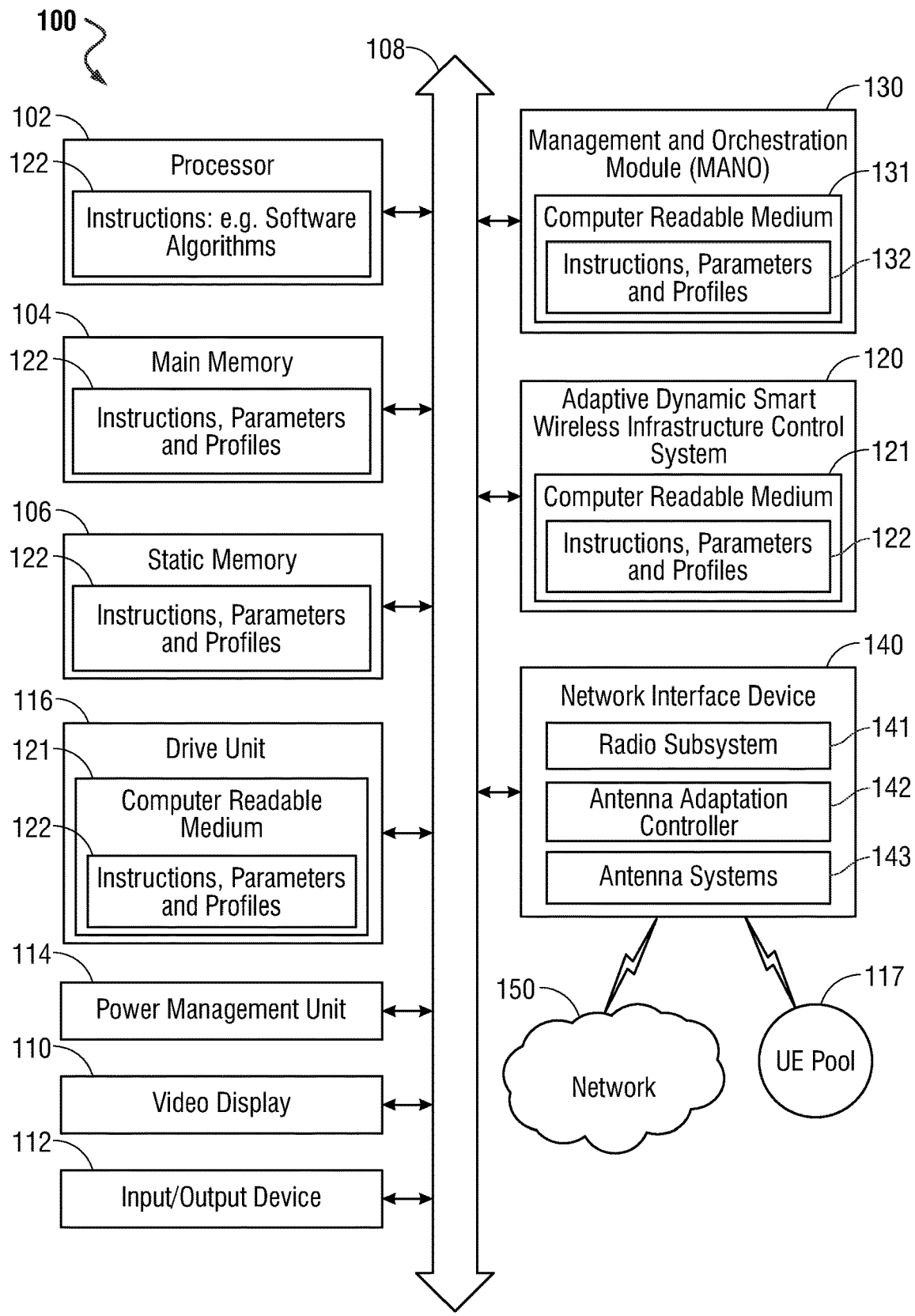
FIG. 1 is a block diagram illustrating an information handling system of an enterprise mobile network Management and Orchestration Module (MANO) according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems such as, for example, laptop/notebook computing devices, desktop computing devices, tablet computing devices, mobile phones, or other endpoint computing devices known in the art as user equipment devices (UEs), often utilize wireless networks in order to exchange data via a plurality of remote cloud networks forming the internet. Such UEs may communicate via one or more wireless links established between an antenna system of the UE and a cellular base station (BS) or non-cellular network access point (AP), for example. Large businesses or corporations may establish campuses in which employee UEs may establish wireless links to a remote cloud network via one or more business-operated enterprise mobile networks that include one or more of enterprise-managed UEs, antenna systems, radio access networks (RANs), and cellular network cores. Such an enterprise mobile network may incorporate infrastructure for establishing wireless links via a plurality of wireless communications standards, such as, for example, 4G cellular, 5G cellular, or non-cellular protocol such as Wi-Fi, or Bluetooth®. In such cases, a single enterprise mobile network may establish wireless links with a pool of UEs via one or more of a 4G Radio Access Network (RAN), a 5G RAN, or a non-cellular wireless communication AP. Further, communications received at each of the 4G RAN, 5G RAN, and non-cellular wireless communication AP may be routed to a remote cloud network via either a 4G Evolved Packet Core (EPC) or a 5G core. Routing non-cellular (e.g., Wi-Fi) traffic through such a 4G or 5G core may allow UEs that are not capable of direct communication with the 4G or 5G networks (e.g., not 4G or 5G compatible) to access the higher throughput and lower latency afforded by the 4G or 5G cellular network cores.

Performance of wireless links the UEs maintain within the enterprise mobile network may vary over time, dependent upon several variables. The accessibility demands of the UE, such as whether the UE is executing applications that require higher throughput, lower latency, or heightened security measures may be included within these variables. Also included within these variables may be the types of cellular networks (4G or 5G) or non-cellular networks (e.g., varying Wi-Fi frequency ranges or Bluetooth®) supported by the UE. The location of the UE with respect to the remaining infrastructure of the enterprise mobile network may also be a variable, as the distance from the 5G RAN and line-of-sight between the UE and 5G RAN may significantly impact connectivity in the 5G mmWave frequency band, for example, or coverage maps may vary. Another variable may be the unique operational capabilities of certain infrastructure components, such as the ability to increase edge computing capacity at the 4G and 5G cores, and performance of network slicing at the 5G core. Finally, traffic or congestion at any one of the infrastructure components within the 4G RAN, 5G RAN, non-cellular AP, 4G EPC, or 5G core may impact throughput or latency of UE communications via the enterprise mobile network. The ways in which each of these variables impacts quality of wireless connections with the pool of UEs wirelessly linked within the enterprise mobile network may vary over time as the applications executed by these UEs changes, various UEs enter or leave the pool of linked UEs, the capabilities of the UEs within the pool changes (e.g., more 4G capable UEs enter and more 5G capable UEs exit), or the locations of various UEs within the pool changes.

Existing systems have addressed the variability of UE connectivity requirements in the past through a variety of means, including adaptively distributing UE wireless links across available wireless communications protocols (e.g., handover from cellular to Wi-Fi), permanently increasing the number of various types of infrastructure components of an enterprise mobile network (e.g., RAN components or cellular network core components) in a given area, permanently increasing the number of antennas at such base stations, or upgrading RANs at those base stations to allow them to establish wireless links in a greater number of available bands (e.g., Wi-MAX or 5G mmWave). Each of these existing solutions provides a permanent increase in wireless link capacity in a given area or within a given enterprise mobile network, which may over or under correct for fluctuating needs of the UEs attempting to access the enterprise network. A system is needed that adaptively and dynamically scales the resources available to various components of the enterprise mobile network to accommodate the needs of the pool of UEs requesting wireless links through a variety of wireless protocols or communication standards, as those needs and the composition of the UE pool changes over time.

The adaptive dynamic smart wireless infrastructure control system in embodiments of the present disclosure addresses these issues by assessing the communication needs for a pool of enterprise-managed UEs wirelessly linked within an enterprise mobile network operating a plurality of cellular and non-cellular RANs, APs, and network cores. The enterprise mobile network, which includes the pool of enterprise-managed UEs in various embodiments described herein, may be managed by enterprise IT professionals via a Management and Orchestration Module (MANO), which may operate in distributed components across the enterprise mobile network, and in particularly, in part at each of the UEs within the enterprise-managed pool. The MANO in embodiments described herein may operate to perform adjustments predicted by the adaptive dynamic smart wireless infrastructure control system (e.g., as output from a neural network) to optimize ability of the enterprise network to meet performance and connectivity requirements of the pool of enterprise-managed UEs.

In various embodiments described herein, the adaptive dynamic smart wireless infrastructure control system may also determine one or more adjustments that may be made to the distribution of computing resources or antenna systems predicted to satisfy performance requirements of the various RANs and cellular network cores, and connectivity requirements of the UEs. Finally, the adaptive dynamic smart wireless infrastructure control system in embodiments may work with a Management and Orchestration Module (MANO) orchestrating performance of the various RANs, APs, and cellular network cores, to execute the determined adjustment to the distribution of computing resources or antenna systems. In such a way, the adaptive dynamic smart wireless infrastructure control system may scale up or increase antenna systems or computing resources of various RANs or APs while scaling down or decreasing antenna systems or computing resources at other RANs or APs to increase the ability of the enterprise mobile network infrastructure to establish wireless links capable of satisfying performance and connectivity requirements.

FIG. 1 illustrates an information handling system 100 of a Management and Orchestration Module (MANO) 130 operating within an enterprise mobile network, or at edge computing for local management and orchestration or at a remote server for global management orchestration and testing according to embodiments described herein. As described herein, the enterprise mobile network may also include the pool 117 of enterprise-managed UEs in various embodiments described herein. The enterprise mobile network and multi-access edge computing (MEC) resources may be managed by enterprise IT professionals via the MANO 130. The MANO 130 in an embodiment may perform adjustments predicted by the adaptive dynamic smart wireless infrastructure control system 120 (e.g., as output from a neural network) to optimize ability of the enterprise mobile network to meet performance and connectivity requirements of the pool 117 of enterprise-managed UEs.

The pool of UEs 117 may communicate via one or more wireless links established by an antenna system of one of the pool of UEs 117 for communication within the enterprise mobile network for example. Large businesses or corporations may establish campuses in which employee UEs (e.g., within the pool 117) may establish wireless links to the remote cloud network 150, or MEC resources via one or more business-operated enterprise wireless communication interface devices (e.g., 140). As described in greater detail with respect to FIG. 2, below, such enterprise mobile networks may incorporate infrastructure for establishing wireless links via a plurality of wireless communications standards, such as, for example, 4G cellular, 5G cellular, or non-cellular protocols such as Wi-Fi, or Bluetooth®. In such cases, a single enterprise mobile network executing a MANO 130 may establish wireless links with the pool of UEs 117 via one or more of the 4G Radio Access Network (RAN), the 5G RAN, a non-cellular wireless communication AP, or future wireless protocol RANs. Further, communications received at each of the 4G RAN, 5G RAN, and non-cellular wireless communication AP may be routed to a remote cloud network 150 via either a 4G Evolved Packet Core (EPC) or a 5G core. The MANO 130 in an embodiment may orchestrate performance at and between each of these non-cellular APs, RANs, and cores.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

More specifically, the information handling system 100 may orchestrate execution of a plurality of computing nodes, pods, clusters, or containers capable of performing computing tasks individually, or in combination with one another. In particular, several aspects of the 4G Radio Access Network (RAN), the 4G EPC, the 5G core, and the 5G RAN may function as containerized software applications executed by one or more runtime engines and orchestrated by the MANO 130. These runtime engines may be executed by one or more processors of a multi-access edge computing platform (MEC) described in greater detail with respect to FIG. 2 below. MEC system resources may be represented by the information handling system 100 of FIG. 1. MEC system resources may include the processor 102, which functions in an embodiment to execute code instructions of the MANO 130 or other applications requiring low-latency for one or more of the pool of UEs 112. The MEC processors may also operate to execute code instructions of various components of the 4G RAN, 5G RAN, 4G EPC, and 5G core for switching, network route selection, authentication, and other functions.

The 5G core, for example, processes data packets received from or en route to a UE (e.g., within pool 117) by executing containerized code instructions of an access and mobility management function (AMF), using MEC processor resources, to make application programming interface (API) calls to other 5G core network functions that each perform one or more data packet preparation steps. Thus, as described in greater detail with respect to FIG. 5 below, the AMF orchestrates execution of a plurality of other containerized 5G core network functions on each data packet received. The MANO 130 in an embodiment may assign specific processors of the MEC system represented by information handling system 100 to the execution of specifically identified 5G core network functions, or to other processing functions of the 4G RAN, 5G RAN, or 4G EPC, for example. The processor 102 in some embodiments may be a server system either in a remote cloud or locally at a MEC information handling system that execute code instructions of the MANO 130 to perform such an assignment. The MANO 130 may also limit the number of calls that each of these RANs or core functions may make to each of those assigned processors, or limit the number of nodes or pods hosting such functions.

The use of containerized software applications facilitates an abstraction or separation between the user of a software application (e.g., the AMF making API calls to the other 5G core network functions), the software application itself (the containerized 5G core network functions), and the computing environment (e.g., computing cluster) in which the software application is executing. As described in greater detail herein with respect to FIGS. 3 and 4, the serving gateway (S-GW) and packet data network gateway (P-GW) of the 4G EPC, the evolved Node B (eNodeB) of the 4G RAN, and the logical 5G radio node (gNodeB) of the 5G RAN may similarly operate through execution of containerized software applications. Thus, portions of the 4G RAN, the 5G RAN, 4G EPC, and the 5G network core in various embodiments described herein may each operate one or more computing nodes, pods, or clusters of computing resources for processing data packets via execution of containerized software applications using MEC memory and processing resources.

These computing nodes, pods, clusters, or containers in an embodiment may store an "image," or compiled, executable set of code instructions for the containerized software application. A run-time engine may access and execute these compiled, executable sets of code instructions according to calls made by a base band unit in the case of 4G RAN (as described in greater detail with respect to FIG. 3), an S-GW or P-GW of the 4G EPC (as described in greater detail with respect to FIG. 3), a RAN intelligent controller node in the case of 5G RAN (as described in greater detail with respect to FIG. 4), or the AMF at the 5G core (e.g., as described in greater detail with respect to FIG. 5). Each of these components capable of executing such run-time engines may further receive control instructions from the MANO 130 to increase or decrease the computing resources (e.g., MEC processor or memory availability, number of pods, number of clusters, number of nodes, number of containerized software application image replicas) dedicated to the processing of data packets according to each of the supported wireless communication standards or protocols (as described in greater detail with respect to FIG. 2 below). In other words, the MANO 130 may operate to increase or decrease the MEC computing resources made available for use by the 4G RAN, the 4G EPC, the 5G RAN, or the 5G core.

Software application containerization separates node configuration instructions from the code instructions for executing the underlying containerized software application (e.g., 4G EPC S-GW or P-GW, 5G core network functions, eNodeB functions, or gNodeB functions), allowing users to deploy the underlying containerized software application to any number of computing clusters or nodes. As software containerization has gained popularity, containerized application deployment tools, such as container-orchestration systems for automating computing application deployment, scaling, and management across several nodes or several clusters have emerged. The MANO 130 in an embodiment may incorporate such container-orchestration system functionality. For example, the MANO 130 in an embodiment may facilitate and manage delivery to a deployment cluster for the 5G network core of cluster configuration files to execute a containerized software application (e.g., 5G core network function), and immutable images of the underlying software application container (e.g., 5G core network function).

Each information handling system 100 may also represent a node that may comprise a separate MEC computing machine, and may contain one or more computing pods, each comprising at least a MEC processor 102 and MEC memory 103. Each pod may execute at least one containerized software application (e.g., a 5G core network function or other enterprise low latency software applications for UEs in pool 117). A single minion node may execute multiple pods, with each pod executing a different instance of the same containerized software application (e.g., a first instance of a 5G core network function, and a replica of the same 5G core network function). This may allow the minion node to quickly scale and balance the load of calls to the containerized software application across a plurality of pods, as well as decrease any downtime associated with bugs or errors occurring at a single pod. In other words, by scaling the number of nodes, pods, clusters, or containers executing any given 5G core network function (or any eNodeB or gNodeB functions), the MANO 130 may scale up or scale down the computing resources dedicated to processing data packets according to a specific UE-requested protocol (e.g., 4G, 5G, or non-cellular).

Information handling system 100 can include devices or modules that embody one or more of the devices or execute instructions for the one or more systems and modules described above, and operates to perform one or more of the methods described above. The information handling system 100 may execute code instructions 122 that may operate on local or remote servers or systems, remote cloud networks, or on-box in individual client information handling systems according to various embodiments herein. In some embodiments, it is understood any or all portions of code instructions 122 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 121 storing instructions 122 of an adaptive dynamic smart wireless infrastructure control system 120, and drive unit 116 (volatile (e.g., random-access memory, etc.), non-volatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device 130 may provide connectivity of the information handling system 100 to one or more UEs (e.g., within pool 117) via one or more LAN or WAN communication links in the case of an enterprise local or remote server as information handling system 100 in an embodiment. As described in greater detail herein, each UE in the pool 117 may communicate with the MANO 130 (e.g., either through wired connection, wireless connection with the 4G RAN, 5G RAN, or AP, or out-of-band (OOB) communications) to share gathered connectivity metrics for wireless links established by that UE, performance metrics describing currently executing software applications at the UE, security requirements for UE wireless communication, power consumption metrics at the UE, processor consumption or other performance metrics at the UE, connectivity requirements, or UE location data.

The network interface device 130 may provide connectivity to a Wide Area Network (WAN), a Wireless Wide Area Network (WWAN) communication network, a private LTE communication network, a 4G LTE public communication network, or a 5G millimeter-wave (mm-wave) communication network, or other cellular communication networks in the case of an information handling system 100 operating as an AP or cellular RAN in some embodiments. Connectivity of the information handling system 100 to the pool 117 of UE devices or to any of a plurality of remote cloud networks 150 in an embodiment may be via wired or wireless connection. In some aspects of the present disclosure, the network interface device 130 may operate two or more wireless links. In other aspects of the present disclosure, the information handling system 100 may include a plurality of network interface devices 130, each operating separate radio subsystems 141.

The network interface device 130 may operate in accordance with any cellular wireless data communication standards. Network interface device 130, in an embodiment, may connect to any combination of macro-cellular wireless connections including 2G, 2.5G, 3G, 4G, 5G or the like from one or more service providers, including an enterprise managed RAN. Utilization of radiofrequency communication bands according to several example embodiments of the present disclosure may include bands used with the WWAN standards, which may operate in both licensed and unlicensed spectrums. More specifically, the network interface device 130 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) of a 4G RAN (as described in greater detail with respect to FIG. 3) in combination with the 4G EPC, or the 5G network core (as described in greater detail with respect to FIG. 5), or a logical 5G radio node (gNodeB) of the 5G RAN (as described in greater detail with respect to FIG. 4), in combination with the 5G network core.

Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands. WWAN may use the Unlicensed National Information Infrastructure (U-NII) band which typically operates in the –5 GHz frequency band such as 802.11 a/h/j/n/ac (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the network interface device 130 may be communicatively coupled to an array of antenna systems 143. The antenna controller 142 may monitor wireless link state information, wireless link configuration data, network slice data, or other input data to generate channel estimation and determine antenna radiation patterns. The network interface device 130 in an embodiment may further include a radio subsystem 141 which may operate to modulate and demodulate signals transceived within a WWAN or WLAN format, set signal transmission power levels or sensitivity to signal reception, select channels or frequency bands, and conduct other functions in support of a wireless transmission from the pool of UEs 117 to 4G EPC 150 or the 5G network core 170.

The network interface device 130 in an embodiment may also provide connectivity to a WLAN network that may be a wired local area network (LAN), a wireless personal area network (WPAN), a public WiFi communication network, a private WiFi communication network, a public WiMAX communication network, a Bluetooth® communication network, or any other non-cellular (non-3GPP) communication networks. To communicate with a wireless local area network, standards including IEEE 802.11 WLAN standards, IEEE 802.15 WPAN standards, WiMAX, Bluetooth®, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the –5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

The information handling system 100 may further include a power management unit (PMU) 114 (a.k.a. a power supply unit (PSU)). The PMU 114 may manage the power provided to the components of the information handling system 100 such as the processor 102 such as a CPU or embedded controller, a cooling system, one or more drive units 116, a graphical processing unit (GPU), a video/graphic display device or other input/output devices 112, and other components that may require power when a power button has been actuated by a user. In an embodiment, the PMU 114 may monitor power levels and be electrically coupled to the information handling system 100 to provide this power and coupled to bus 108 to provide or receive data or instructions.

Information handling system 100 includes one or more of an operating system (OS), and basic input/output system (BIOS) firmware/software or application programs that may be executable instructions 122 executed at any processor 102 and stored at one or more memory devices 104, 106, or 116. BIOS firmware/software functions to initialize information handling system 100 on power up, to launch an OS, and to manage input and output interactions between the OS and the other elements of information handling system 100. In a particular embodiment, BIOS firmware/software resides in memory 104, and include machine-executable code that is executed by processor 102 to perform various functions of information handling system 100 as described herein. In another embodiment (not illustrated), application programs and BIOS firmware/software reside in another storage medium of information handling system 100. For example, application programs and BIOS firmware/software can reside in drive 116, in a ROM (not illustrated) associated with information handling system 100, in an option-ROM (not illustrated) associated with various devices of information handling system 100, in a storage system (not illustrated) associated with network channel of the network interface device 130, in another storage medium of information handling system 100, or a combination thereof. Executable code instructions 122 for application programs and BIOS firmware/software can each be implemented as single programs, or as separate programs carrying out the various features as described herein.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 122 or receives and executes instructions, parameters, and profiles 122 responsive to a propagated signal. The information handling system 100 can include a set of instructions 122 that can be executed to cause the computer system to perform any one or more of the methods or computer-based functions disclosed herein. For example, instructions 122 may execute an adaptive dynamic smart wireless infrastructure control system 120 in an embodiment to assess the communication needs for the pool of UEs 117 wirelessly linked to a managed RAN 150 such as a 4G RAN, a 5G RAN, and the non-cellular AP managed by the MANO 130, and determine one or more adjustments that may be made to the distribution of computing resources or antenna systems that are predicted to increase a percentage of the pool of UEs 117 wirelessly linked within the enterprise mobile network managed by the MANO 130 via the specific type of wireless communication standard or protocol requested by each of the pool of UEs 117 or capable of satisfying the performance requirements for software applications executing at those UEs in pool 117. In another aspect of an embodiment, the adaptive dynamic smart wireless infrastructure control system 120 may work with the MANO 130 orchestrating performance of the various RANs, APs, and cellular network cores, to execute the determined adjustment to the distribution of computing resources or antenna systems.

In such a way, the adaptive dynamic smart wireless infrastructure control system may scale up or increase antenna systems or MEC computing resources of a UE-preferred RAN or AP while scaling down or decreasing antenna systems or MEC computing resources at another RAN or AP to increase the capacity of the UE-preferred RAN or AP to establish wireless links while demand for that UE-preferred RAN or AP remains high. Similarly, the adaptive dynamic smart wireless infrastructure control system may scale up or increase MEC computing resources of a UE-preferred 5G core to increase the capacity of the UE-preferred 5G core to process communications received via the 5G RAN, the 4G RAN, or a non-cellular AP, while demand for that UE-preferred 5G core remains high. In these example embodiments and other methods described herein, the adaptive dynamic smart wireless infrastructure control system may adaptively and dynamically scale the MEC resources available to various components of the enterprise mobile network to accommodate the needs of the pool 117 of UEs requesting wireless links through a variety of wireless protocols or communication standards, as those needs and the composition of the UE pool 117 changes over time.

Various software modules comprising application instructions 122 may be coordinated by an operating system (OS), and/or via one or more application programming interfaces (APIs). An example operating system may include Windows®, Android®, and other OS types known in the art. Example APIs may include Win 32, Core Java API, or Android APIs.

The disk drive unit 116 and may include a computer-readable medium 121 in which one or more sets of instructions 122 such as software can be embedded to be executed by the processor 102 and antenna controller 142 to perform the processes described herein. Similarly, main memory 104 and static memory 106 may also contain a computer-readable medium for storage of one or more sets of instructions, parameters, or profiles 122. The disk drive unit 116 or static memory 106 also contain space for data storage. Further, the instructions 122 may embody one or more of the methods or logic as described herein. In a particular embodiment, the instructions, parameters, and profiles 122 may reside completely, or at least partially, within the main memory 104, the static memory 106, and/or within the disk drive 116 during execution by the processor 102 or an antenna controller (e.g., 132, or 142) of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include access to a computer-readable medium 121 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
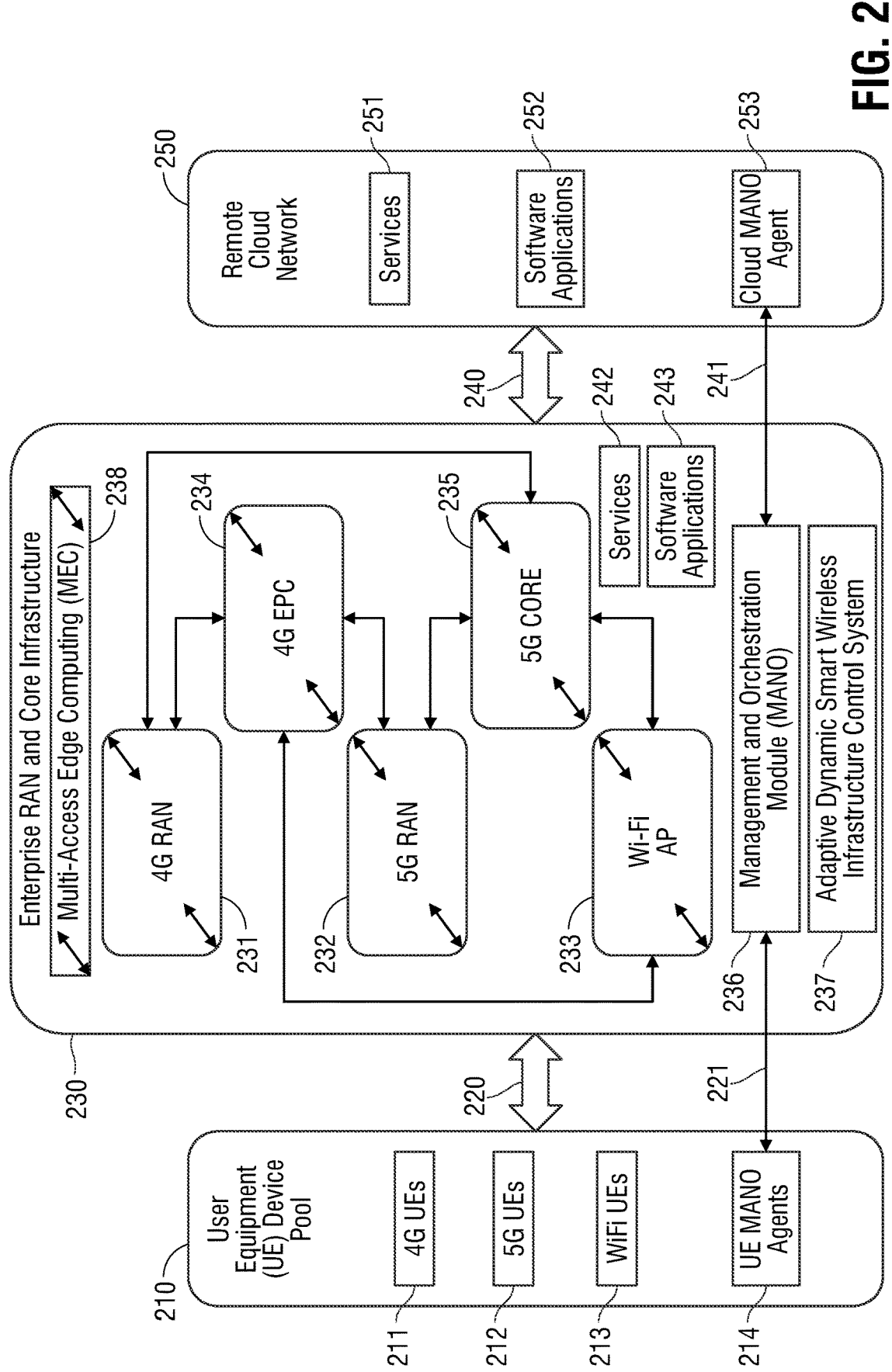
FIG. 2 is a block diagram illustrating an enterprise mobile network comprising various infrastructure components managed by a MANO according to an embodiment of the present disclosure.

FIG. 2 is a block diagram illustrating connectivity of a pool of user equipment devices (UEs) to a remote cloud network, via an enterprise mobile network comprising various and plural managed RAN, cellular network core, and MEC infrastructure components managed by a management and orchestration module (MANO) according to an embodiment of the present disclosure. As described herein, information handling systems, or user equipment devices (UEs) (e.g., within a pool 210) often utilize wireless networks in order to exchange data via a plurality of remote cloud networks (e.g., 250) forming at least a portion of the internet. Such UEs may communicate via one or more wireless links (e.g., 220) established between the UE and one or more business-operated enterprise RAN and core infrastructure modules (e.g., 230). For example, enterprise RAN and core infrastructure module 230 may incorporate infrastructure for establishing wireless links via a plurality of wireless communications standards, such as, for example, 4G cellular, 5G cellular, or non-cellular protocol such as Wi-Fi, or Bluetooth®. In such cases, a single enterprise RAN and core infrastructure module 230 may establish wireless links with a pool 210 of UEs via one or more of a 4G Radio Access Network (RAN) 231, a 5G RAN 232, or a non-cellular wireless communication AP 233. Further, communications received at each of the 4G RAN 231, 5G RAN 232, and non-cellular wireless communication AP 233 may be routed to a remote cloud network 250 via either a 4G Evolved Packet Core (EPC) 234 or a 5G core 235 and a wired backhaul connection 240 (e.g., SG1-U interface or N6 interface defined by the ETSI technical specifications 3GPP TS 23.88 and 3GPP TS 23.501, respectively).

Each of these enterprise mobile network infrastructure components (e.g., 231, 232, 233, 234, or 235) may utilize processors and memory of a Multi-Access Edge Computing Platform (MEC) 238, or other processing resources co-located at the enterprise RAN and core infrastructure 230 in order to execute their required processing of data frames or packets. In other words, ability of each of the enterprise mobile network infrastructure components (e.g., 231, 232, 233, 234, or 235) to perform may hinge upon the volume and quality of MEC 238 resources made available to it. Thus, the overall quality (e.g., as measured by QoS metrics such as latency, throughput, or dropped packets) of connectivity between the UE pool 210 and services 251 or software applications 252 at the remote cloud network 250 or edge services 242 or edge software applications 243 in an embodiment may be impacted by configuration and execution of the 4G RAN 231, 5G RAN 232, Wi-Fi AP 233, 4G EPC 234, 5G core 235, and MEC 238, and by routing of communications between and among each of these enterprise mobile network infrastructure components (e.g., 231, 232, 233, 234, or 235). The Management and Orchestration Module 236 and the adaptive dynamic smart wireless infrastructure control system 237 in an embodiment may operate to adaptively optimize such infrastructure configurations and traffic routing to provide the best overall connectivity between the UE pool 210 and the remote cloud network 250 or local MEC resources 258 as the demands of those UEs in pool 210 change over time.

The UE pool 210 may include several different types of mobile devices, each with different networking capabilities. For example, the pool 210 may include 4G UEs 211 that are capable of communication via the 4G cellular communications standard, 5G UEs 212 that are capable of communication via the 5G cellular communications standard, or Wi-Fi UEs 213 that are capable of communication via non-cellular (e.g., non-3GPP) communications standards such as Wi-Fi, Bluetooth®, and Near Field Communication (NFC). Some UEs within pool 210 may comprise 4G UEs 211 and 5G UEs 212, if such UEs are capable of communication according to both of these standards. As another example, some UEs within pool 210 may be capable of communication according to both the 4G communications standard and the non-cellular (e.g., Wi-Fi) standard, such that those UEs comprise both 4G UEs 211 and Wi-Fi UEs 213. In yet another example, some UEs within pool 210 may be capable of communication according to both the 5G communications standard and the non-cellular (e.g., Wi-Fi) standard, such that those UEs comprise both 5G UEs 212 and Wi-Fi UEs 213. In still another example, some UEs within pool 210 may be capable of communication according to the 4G communications standard, the 5G communications standard, and the non-cellular (e.g., Wi-Fi) standard, such that those UEs comprise both 4G UEs 211, 5G UEs 212, and Wi-Fi UEs 213. It is contemplated that various UEs in pool 210 may have any combination of wireless capabilities in some embodiments.

Each of the UEs in pool 210 may execute a UE-based agent 214 of the MANO 236. These UE MANO agents 214 in an embodiment may communicate with the MANO 236 located at the enterprise RAN and core infrastructure module 230 and managed by the enterprise to gather performance and connectivity metrics and performance and connectivity requirements for each of the UEs within pool 210. Such communication may occur via wireless links 220 established between the pool of UEs 210 and one or more of the 4G RAN 231, 5G RAN 232 or Wi-Fi AP 233, or via wired or wireless out-of-band (OOB) communications 221 directly between the MANO 236 and the UE MANO agents 214 in an embodiment. This data, along with data gathered at the various infrastructure components (e.g., 231, 232, 233, 234, or 235) of the enterprise RAN and core infrastructure module 230 may be used to determine current and desired connectivity between the UE pool 210 and the remote cloud network 250.

Performance metrics of the UEs in pool 210 in an embodiment may describe currently executing software applications at each of the UEs, battery power remaining at each of the UEs, or security profiles for each of the UEs, for example. Performance requirements of the UEs in pool 210 may describe capped battery usage requirements for each UE, for example. Connectivity metrics in an embodiment for each UE may include measurements of various quality of service (QoS) variables for established wireless links (e.g., 220), including, for example, latency, throughput, dropped packets, security levels (e.g., Virtualized Private Network (VPN) tunnels), or network slice designations. Connectivity requirements for each UE in pool 210 may describe available types of wireless radios of the UEs. Connectivity requirements for each UE in pool 210 in an embodiment may further describe QoS requirements for each UE, as defined by policies associated with each UE, or as determined by the MANO 236 or its agents 214 based on currently executing software applications at each of the UEs in pool 210.

Each of these variables may impact overall quality of communications between the pool of UEs 210 and the remote cloud network 250 in an embodiment. For example, accessibility demands of the UEs in pool 210, such as whether the UE is executing applications that require higher throughput, lower latency, or heightened security measures may be included within these variables. Also included within these variables may be the types of cellular networks (4G or 5G) or non-cellular networks (e.g., varying Wi-Fi frequency ranges or Bluetooth®) supported by the UE. The location of the UE with respect to the enterprise RAN and core infrastructure module 230 may also be a variable, as the distance from the 5G RAN 232 and line-of-sight between the UE and 5G RAN 232 may significantly impact connectivity in the 5G mmWave frequency band, for example, or coverage maps may vary for other RANs 231 or 235. Another variable may be the unique operational capabilities of certain infrastructure components, such as the ability to increase edge computing (e.g., MEC 238) capacity at the 4G EPC 234 and 5G core 235, and performance of network slicing at the 5G core 235. Finally, traffic or congestion at any one of the infrastructure components within the 4G RAN 231, 5G RAN 232, non-cellular AP 233, 4G EPC 234, or 5G core 235 may impact throughput or latency of communications between a UE in pool 210 and the remote cloud network 250 via the enterprise RAN and core infrastructure module 230. The ways in which each of these variables impacts quality of connection between the pool of UEs 210 and the remote cloud network 250 may vary over time as the applications executed by these UEs in pool 210 changes, various UEs enter or leave the pool 210 of linked UEs, the capabilities of the UEs within the pool 210 changes (e.g., 4G UEs 211 increase in volume or 5G UEs 212 decrease in volume), or the locations of various UEs within the pool 210 changes relative to the enterprise RAN and core infrastructure module 230.

The MANO 236 in an embodiment may also gather performance metrics and requirements, connectivity metrics and requirements, infrastructure component configurations, MEC resource distribution metrics from each of the 4G RAN 231, the 5G RAN 232, the Wi-Fi AP 233, the 4G EPC 234, and the 5G network core 235 in order to optimize overall connectivity between the user pool 210 and the remote cloud network 250 or MEC 238 resources in an embodiment. For example, the MANO 236 may gather from each of these enterprise mobile network infrastructure components (e.g., the 4G RAN 231, the 5G RAN 232, the Wi-Fi AP 233, the 4G EPC 234, and the 5G network core 235) performance metrics and requirements describing, for example, guaranteed bitrates, number of network slices available, number of active bearers and wireless links established with the pool of UEs 210, processor utilization rates, and antenna and switch loads. The MANO 236 may further gather RAN and MEC infrastructure component configurations from the MEC 238, including current and total processor and memory availability, and distribution of processing and memory resources of the MEC 238 made available to each of the 4G RAN 231, the 5G RAN 232, the Wi-Fi AP 233, the 4G EPC 234, and the 5G network core 235.

The adaptive dynamic smart wireless infrastructure control system 237 in an embodiment may assess the communication needs for a pool 210 of enterprise-managed UEs wirelessly linked to an enterprise RAN and core infrastructure module 230 operating a plurality of cellular and non-cellular RANs, APs, and network cores. Both the enterprise RAN and core infrastructure module 230 and the pool 210 of enterprise-managed UEs in various embodiments described herein may be managed by enterprise IT professionals via a Management and Orchestration Module (MANO) 236, which may operate in part at the enterprise RAN and core infrastructure module 230, and in part (e.g., via UE MANO agents 214) at each of the UEs within the enterprise-managed pool 210 as well as remotely-located global management and orchestration in the cloud in various embodiments. The MANO 236 in embodiments described herein may operate to perform adjustments predicted by the adaptive dynamic smart wireless infrastructure control system 237 (e.g., as output from a neural network) to optimize ability of the enterprise network to meet performance and connectivity requirements of the pool 210 of enterprise-managed UEs.

Figure 3:
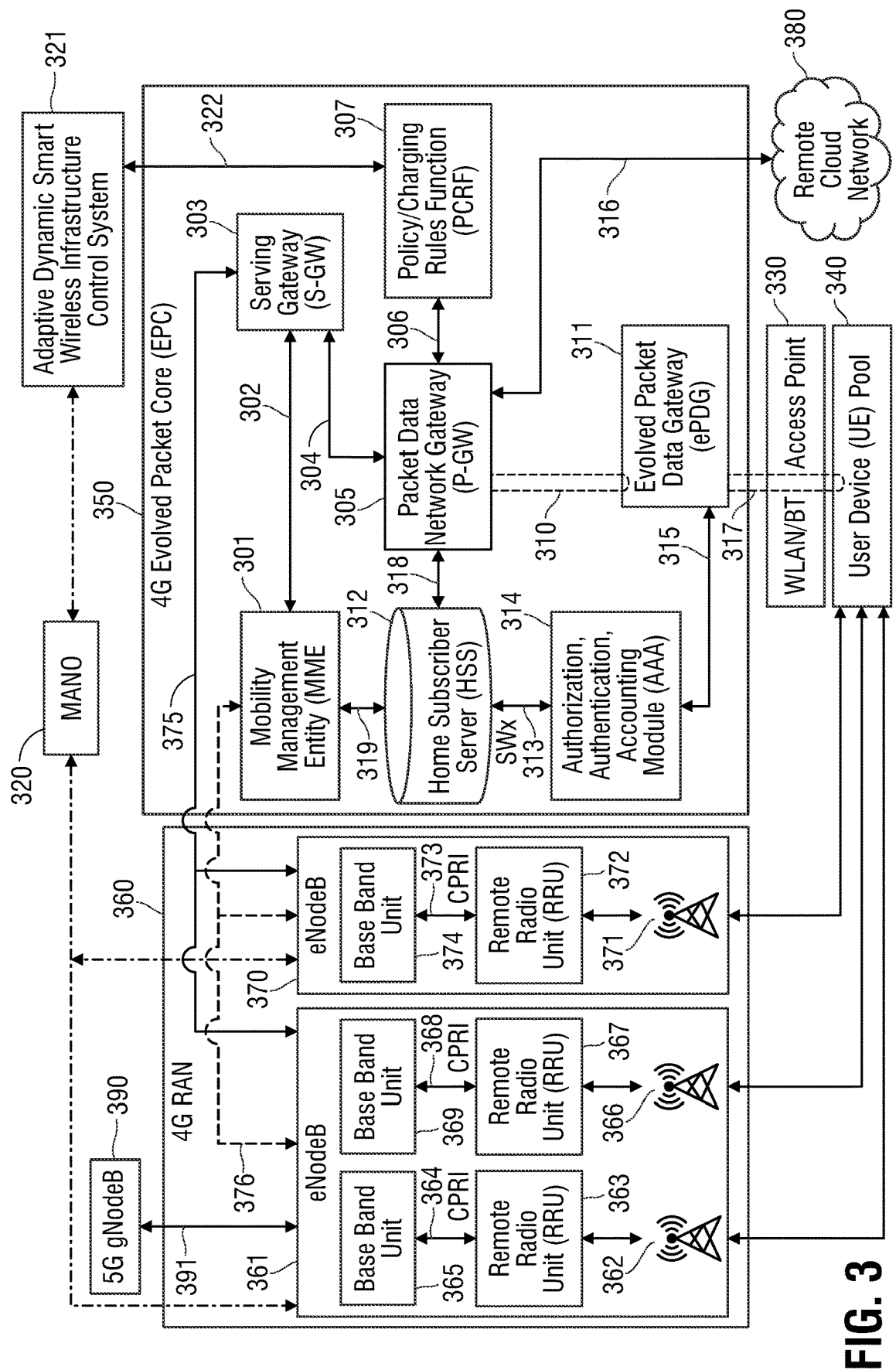
FIG. 3 is a block diagram illustrating a 4G Radio Access Network (RAN) and Evolved Packet Core (EPC) according to an embodiment of the present disclosure.
Figure 4:
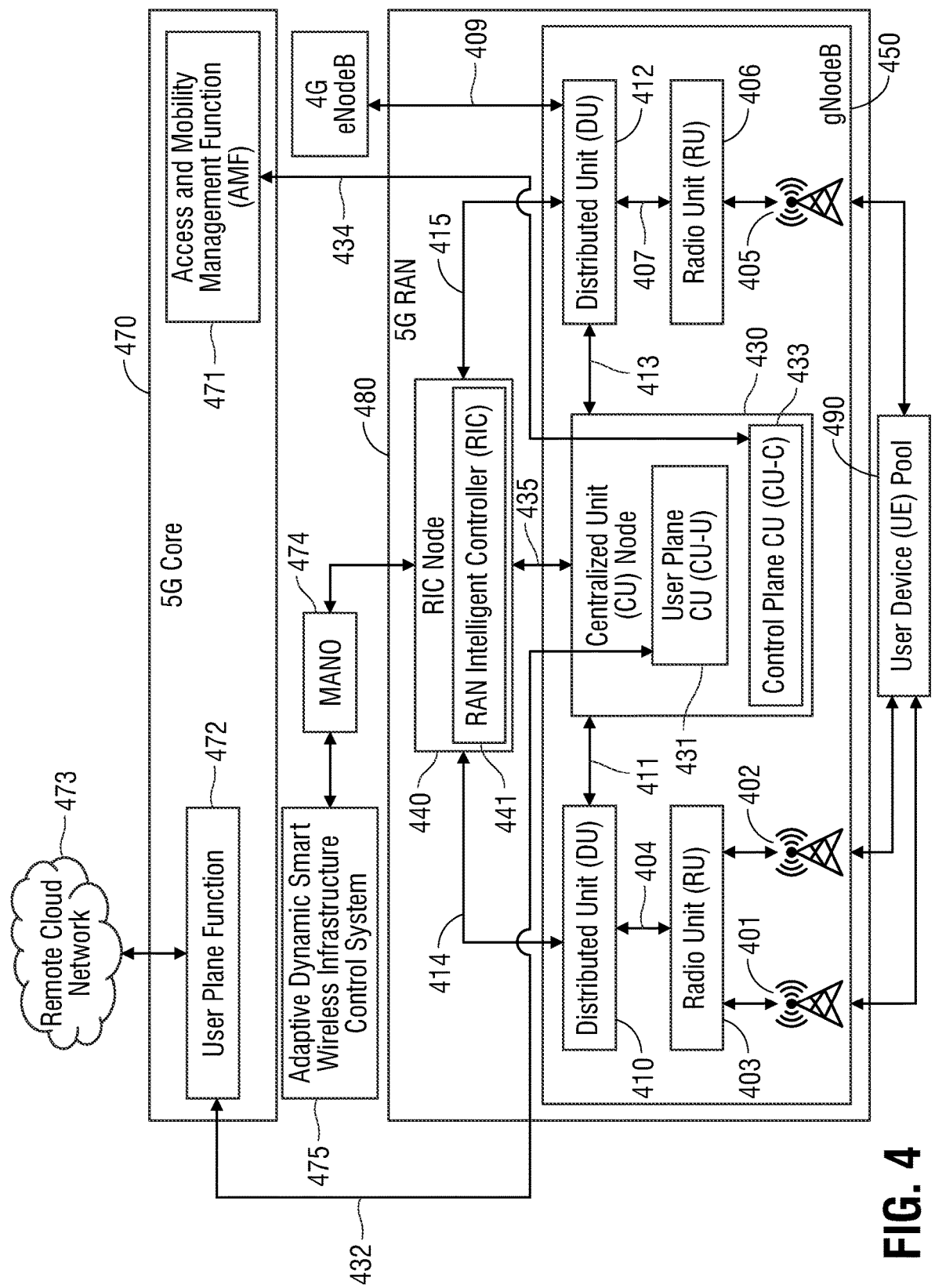
FIG. 4 is a block diagram illustrating a 5G RAN according to an embodiment of the present disclosure.

Several aspects of the 4G RAN 231, the 5G RAN 232, the 4G EPC 234 and the 5G core 235 may function as containerized software applications executed by one or more run-time engines and orchestrated by the MANO 235, described in greater detail herein with respect to FIGS. 3-4. The 5G core 235, for example, processes data packets received from or en route to a UE (e.g., in pool 210) by executing containerized code instructions of an access and mobility management function (AMF) to make application programming interface (API) calls to other 5G core network functions that each perform one or more data packet preparation steps. As another example, the 4G RAN 231 may execute containerized code instructions of a base band unit (BBU), and the 5G RAN 232 may execute containerized code instructions of a distributed unit (DU) or a centralized unit (CU). In yet another example, the 4G EPC 234 may execute containerized code instructions of a serving gateway (S-GW) or a packet data network gateway (P-GW).

The use of containerized software applications facilitates an abstraction or separation between the user of a software application (e.g., the AMF making API calls to the other 5G core network functions), the software application itself (the containerized 5G core network functions), and the computing environment (e.g., computing cluster within the MEC 238) in which the software application is executing. In other words, the MEC 238 may comprise the physical servers, processors, memory, or other computing resources utilized by various infrastructure components of the enterprise RAN and core infrastructure module 230 to execute their respective containerized software applications (e.g., network functions). The Wi-Fi AP 233 and UEs in pool 210 in an embodiment may also utilize such MEC 238 physical resources to execute services 242 or software applications 243 that, for example, may require low latency function. Such services 242 or software applications 243 may also be containerized in MEC 238 in some embodiments as among various UEs. Thus, the 4G RAN 231, the 5G RAN 232, the Wi-Fi AP 233, the 4G EPC 234, and the 5G network core 235 in various embodiments described herein may each operate one or more computing nodes, pods, or clusters of computing resources made available by the MEC 238 for processing data packets via execution of containerized software applications. The number, power, maximum capacity or load for various processors of the MEC 238 may be scaled up or down in order to increase or decrease processing resources made available across the entirety of the enterprise RAN and core infrastructure module 230 in some embodiments. In other embodiments, the processing resources made available to a specific infrastructure component (e.g., 4G EPC 234 or 5G core 235) of the enterprise RAN and core infrastructure module 230 may be scaled up or down, based on infrastructure adjustments determined by the adaptive dynamic smart wireless infrastructure control system 237 and implemented by the MANO 236. Similarly, the memory capacity and accessibility of the MEC 238 may be scaled up or down in order to support increased or decreased containerized software application replication rates or edge services 242 or edge software applications 243 that need support among the pool of UEs 210 across the entirety of the enterprise RAN and core infrastructure module 230 in an embodiment. In another aspect of an embodiment, the memory resources made available to a specific infrastructure component (e.g., 4G RAN 231 or 5G RAN 232) of the enterprise RAN and core infrastructure module 230 may be scaled up or down, based on infrastructure adjustments determined by the adaptive dynamic smart wireless infrastructure control system 237 and implemented by the MANO 236.

The MEC 238 computing nodes, pods, clusters, or containers in an embodiment may store an "image," or compiled, executable set of code instructions for the containerized software application. A run-time engine may access and execute these compiled, executable sets of code instructions according to calls made by a base band unit in the case of 4G RAN 231 (as described in greater detail with respect to FIG. 3), a RAN intelligent controller node in the case of 5G RAN 232 (as described in greater detail with respect to FIG. 4), or the AMF at the 5G core 235 (e.g., as described in greater detail with respect to FIG. 5).

Software application containerization separates node configuration instructions from the code instructions for executing the underlying containerized software application (e.g., 5G core network functions, eNodeB functions, gNodeB functions, edge services 242 or edge software applications 243), allowing users to deploy the underlying containerized software application to any number of computing clusters or nodes facilitated by the MEC 238. As software containerization has gained popularity, containerized application deployment tools, such as container-orchestration systems for automating computing application deployment, scaling, and management across several nodes or several clusters have emerged.

The MANO 236 in an embodiment may incorporate such container-orchestration system functionality to distribute MEC 238 processing and memory resources among the 4G RAN 231, 5G RAN 232, Wi-Fi AP 233, 4G EPC 234, and 5G core 235. For example, the MANO 236 in an embodiment may facilitate and manage delivery to a deployment cluster of one of the enterprise mobile network infrastructure components (e.g., 4G RAN 231, 5G RAN 232, Wi-Fi AP 233, 4G EPC 234, and 5G core 235) cluster configuration files to execute a containerized software application (e.g., 4G RAN BBS, 5G RAN DU or CU, 4G EPC S-GW or P-GW, or 5G network functions), and immutable images of the underlying software application container. The MANO 236 in an embodiment may increase or scale up the capabilities of any of the enterprise mobile network infrastructure components (e.g., 4G RAN 231, 5G RAN 232, Wi-Fi AP 233, 4G EPC 234, and 5G core 235) by deploying more clusters, pods, or nodes dedicated to execution of containerized software applications for those components. Such a deployment of additional clusters, pods, or nodes may be achieved by increasing a replication rate for such containerized software applications. Similarly, the MANO 236 in an embodiment may decrease or scale down the capabilities of any of the enterprise mobile network infrastructure components (e.g., 4G RAN 231, 5G RAN 232, Wi-Fi AP 233, 4G EPC 234, and 5G core 235) by removing, repurposing, or taking offline clusters, pods, or nodes dedicated to execution of containerized software applications for those components. Such a removal, repurposing, or taking offline of clusters, pods, or nodes may be achieved by decreasing a replication rate for such containerized software applications.

The MANO 236 in an embodiment may further scale the various enterprise mobile network infrastructure components (e.g., 4G RAN 231, 5G RAN 232, Wi-Fi AP 233, 4G EPC 234, and 5G core 235) by restricting MEC 238 computing resources made available to each of these components. For example, the MANO 236 may increase the ability of an enterprise mobile network infrastructure component (e.g., 4G RAN 231, 5G RAN 232, Wi-Fi AP 233, 4G EPC 234, and 5G core 235) to process a given volume of data packets over a preset time period (e.g., throughput of the component) by increasing the number of processor calls that infrastructure component (e.g., 4G RAN 231, 5G RAN 232, Wi-Fi AP 233, 4G EPC 234, and 5G core 235) may make to the processor within the MEC 238 assigned to handle calls from that infrastructure component.

Figure 9:
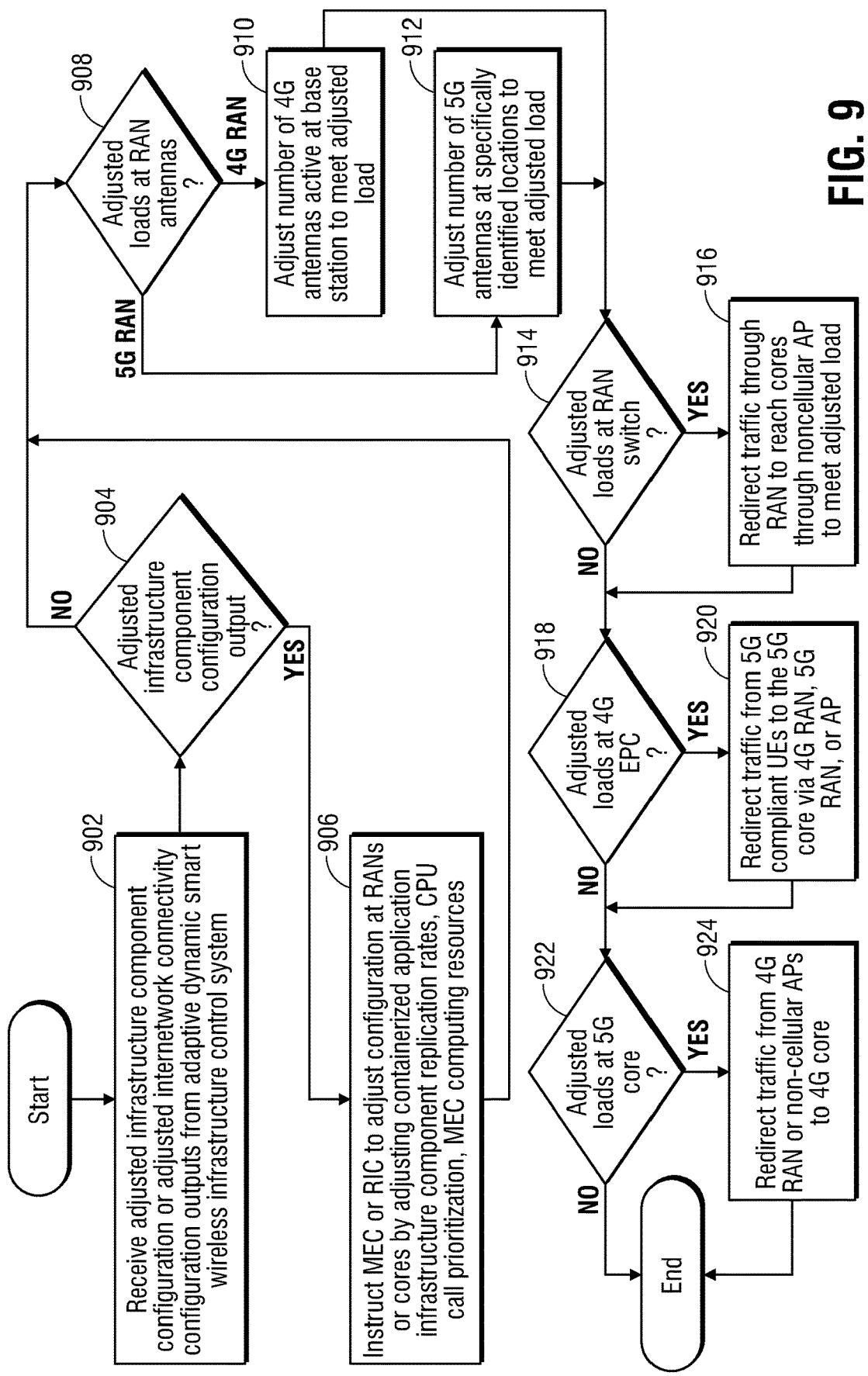
FIG. 9 is a flow diagram illustrating a method of adjusting computing and transceiving resources dedicated to execution of 5G communication infrastructure according to an embodiment of the present disclosure.

In another aspect of an embodiment, the MANO 236 may make adjustments to the routes by which data is transmitted between each of the UEs in pool 210 and the MEC resources 238 or the remote cloud network 250, based on determinations made by the adaptive dynamic smart wireless infrastructure control system 237, as described in greater detail with respect to FIG. 9. For example, UEs within pool 210 may be capable of establishing wireless links 220 with one or more of the 4G RAN 231, the 5G RAN 232, and the Wi-Fi or non-cellular AP 233. Further, each of the 4G RAN 231, 5G RAN 232, and Wi-Fi or non-cellular AP 233 in an embodiment may be capable of transceiving data locally with the MEC resources 238 or remotely with the cloud network 250 via either the 4G EPC 234 or the 5G core 235.

The routing of each of these communication links in an embodiment may impact overall quality of connectivity between the UE pool 210 and the MEC resources 238 or remote cloud network 250, due to potential bottlenecks within one or more of these infrastructure components (e.g., 4G RAN 231, 5G RAN 232, Wi-Fi AP 233, 4G EPC 234, and 5G core 235). The MANO 236 and adaptive dynamic smart wireless infrastructure control system 237 in an embodiment may work in tandem with one another to distribute the traffic between the UE pool 210 and the MEC resources 238 or the remote cloud network 250 and among the infrastructure components (e.g., 4G RAN 231, 5G RAN 232, Wi-Fi AP 233, 4G EPC 234, and 5G core 235) so as to maximize performance of such overall communication, as described in greater detail with respect to FIG. 9, below. In such a way, the adaptive dynamic smart wireless infrastructure control system 237 and the MANO 236 in an embodiment may scale up or increase antenna systems or computing resources of various RANs or APs while scaling down or decreasing antenna systems or computing resources at other RANs or APs to increase the ability of the enterprise mobile network infrastructure to establish wireless links capable of satisfying performance and connectivity requirements.

This maximizes use of existing infrastructure to provide optimized wireless access and resources to a pool 210 of managed UEs and reduce the need and expense of deployment of additional infrastructure as the composition of UEs in pool 210 changes. Based on end-to-end data connection data and available network resources and computing resources, the MANO 236 executing 237 may adjust antenna selection and configurations for individual UEs in pool 210 as well as antenna usage at managed RANs 231, 232, and 233, plus EPC core 234 and 5G core 235 utilization.

FIG. 3 is a block diagram illustrating a 4G Radio Access Network (RAN) 360 and Evolved Packet Core (EPC) 350 of an enterprise mobile network according to an embodiment of the present disclosure. As described herein, user equipment devices (UEs), such as laptop/notebook computing devices, desktop computing devices, tablet computing devices, mobile phones, or other endpoint computing devices often utilize wireless networks in order to exchange data via a plurality of remote cloud networks 380. Such UEs may communicate via one or more wireless links established between an antenna system of the UE and a 4G Radio Access Network (RAN) 360 or non-cellular network access point (AP) 330, for example. Large businesses or corporations may establish campuses in which employee UEs may establish wireless links to a remote cloud network 380 via one or more business-operated enterprise mobile networks. Such enterprise mobile network may incorporate infrastructure for establishing wireless links via a plurality of wireless communications standards, such as, for example, 4G cellular, 5G cellular, or non-cellular protocol such as Wi-Fi, or Bluetooth®. In such cases, a single enterprise mobile network may establish wireless links with a pool 340 of UEs via one or more of a 4G RAN (e.g., 360), a 5G RAN, or a non-cellular wireless communication AP (e.g., 330). Further, communications received at each of the 4G RAN (e.g., 360), 5G RAN, and non-cellular wireless communication AP (e.g., 330) may be routed to a remote cloud network 380 via either a 4G Evolved Packet Core (EPC) (e.g., 350) or a 5G core. FIG. 3 illustrates a 4G RAN 360 communicably linked to a pool of UEs 340, a 5G gNodeB 390 of a 5G RAN, and a 4G EPC 350 to establish wireless communications according to the 4G standard with the pool of UEs 340.

The 4G RAN 360 comprises a plurality of nodes called eNodeBs (e.g., 361 or 370) that operate to transceive data with the user device (UE) pool 340 according to 4G wireless communication standards. Each eNodeB (e.g., 361 or 370) performs radio resource management tasks, mobility management functions, and performs any necessary encryptions or decryptions on received data packets. For example, the eNodeB (e.g., 361 or 370) may track where each of the pool of UEs 340 are located, manage co-channel interference, radio resources, and other radio transmission characteristics such as transmit power, user allocation, beamforming, data rates, handover criteria, modulation schemes, and error coding schemes, to utilize the limited radio-frequency spectrum resources and radio network infrastructure as efficiently as possible.

An eNodeB (e.g., 361 or 370) may comprise at least one group of an antenna system, a Remote Radio Unit (RRU), and a Base Band Unit in an embodiment. For example, eNodeB 370 may incorporate a single antenna system 371, a single RRU 372, and a single base band unit (BBU) 374 in an embodiment. As another example, eNodeB 361 in an embodiment may incorporate one group of infrastructure including antenna system 362, RRU 363, and BBU 365, and another group of infrastructure including antenna system 366, RRU 367, and BBU 369. The UE pool 340 in an embodiment may include one or more UEs capable of establishing wireless links with the 4G RAN 360. In some embodiments, a single UE within the pool 340 may establish multiple wireless links with the 4G RAN 360. For example, a single UE within the pool 340 in an embodiment may establish one wireless link with antenna system 362 and another wireless link with antenna system 366. Similarly, each of the antenna systems (e.g., 362, 366, and 371) may be capable of establishing wireless links with a plurality of UEs within the UE pool 340.

In an example embodiment, one or more UEs within pool 340 may establish a plurality of wireless links with an eNodeB 361 comprising a plurality of antennas 362 and 366, a plurality of RRUs 363 and 367, and a plurality of BBUs 365 and 369. In such an embodiment, the antenna systems 362 and 366 may transceive data packets within electronic radio frequency (RF) signals according to the 4G cellular standard. Upon receipt of a such RF signals from the pool of UEs 340, the RRUs 363 and 367 in such an embodiment may perform RF signal processing functionality like transmit and receive functions, filtering, amplification, analog-to-digital conversion, digital-to-analog conversion, up-conversion, and down-conversion on the received RF signals. In such a way, each RRU (e.g., 363 and 367, or 372) in an embodiment may operate as network interface device capable of processing a maximum uplink load according to an adjustable load setting.

Each of the RRUs 363 and 367 in such an embodiment may be connected to BBU 365 and BBU 369, respectively, via optical fibers 364 and 368, respectively. Each of these optical fibers 364 and 368 in an embodiment may transceive data according to the common public radio interface (CPRI). The BBUs 365 and 369 may process uplink and downlink data traffic and control functionality of the RRUs 363 and 367, respectively. For example, BBUs 365 and 369 may orchestrate uplink and downlink traffic across antennas 362 and 366, respectively, during execution of multiple input multiple output (MIMO) transmissions. In such an embodiment, processing resources available to the single eNodeB 361 may be consumed during execution of these functions of the plurality of RRUs 363 and 367 and the plurality of BBUs 365 and 369. Each BBU (e.g., 365, 369, or 374) in an embodiment may operate as a containerized software application. The number of BBUs executing at any given eNodeB (e.g., 361 or 370), or across the entire 4G RAN 360 in an embodiment may be dictated by a preset BBU replication rate. The performance of the BBUs (e.g., 365, 369, or 374) in an embodiment may further be impacted by a preset processor call priority setting which dictates the priority with which a processor may execute calls from such BBUs. In other words, a higher processor call priority setting may result in a BBU processing a higher volume of data packets over a certain time period than another BBU with a lower processor call priority setting.

A UE within pool 340 in another example embodiment may establish a wireless link with an eNodeB 370 comprising a single antenna 371, single RRU 372, and single BBU 374. In such an embodiment, a UE within the pool 340 may establish a wireless link with antenna system 371, for example. In such an embodiment, the antenna system 371 may transceive data packets within a radio frequency band utilized under a 4G RAN protocol, the RRU 372 may receive these data packets via the antenna system 371, and the BBU 374 may receive data packets processed by the RRU 372 via optical fiber 373 transceiving data in CPRI format. Similarly to the eNodeB 361 infrastructure described directly above, RRU 372 in such an embodiment may perform RF signal processing functionality, and BBU 374 may process uplink and downlink data traffic and control RRU 372 functionality. In such an embodiment, processing resources available to the single eNodeB 370 may be consumed during execution of these functions of the single RRU 372 and the single BBU 374.

In other words, in an embodiment in which eNodeB 361 and eNodeB 370 have access to the same processing resources, fewer of those resources may be dedicated to execution of functions by the RRUs 363 and 367 and BBUs 365 and 369 than may be dedicated to execution of functions by the RRU 372 and BBU 374. This may cause an increase in processing time, and thus an increase in latency for transceiving of data packets through the eNodeB 361 in comparison to transceiving of data packets through the eNodeB 370, for example. However, placing two antennas 362 and 366 within a single eNodeB 361 increases the volume of data packets that may be transceived via wireless links with eNodeB 361 during any given time period (e.g., throughput of wireless links with eNodeB 361) in comparison to the throughput of wireless links established with eNodeB 370. Thus, increasing the number of antenna systems (e.g., 362 and 366), RRUs (e.g., 363 and 367) and BBUs (e.g., 365 and 369) within a single eNodeB (e.g., 361) in an embodiment may increase latency and throughput, while decreasing the number of antenna systems (e.g., 371), RRUs (e.g., 372), and BBUs (e.g., 374) within a single eNodeB (e.g., 370) may decrease latency and throughput.

4G RAN 360 eNodeBs (e.g., 361 and 370) in an embodiment may obtain authenticated access and authorized transceiving of packets and transceive data packets for further processing to the 4G Evolved Packet Core 350. In other embodiments, the 4G RAN 360 may transmit data packets for further processing to a 5G core via an optical fiber 391 and 5G logical 5G radio node (gNodeB) 390 of the 5G RAN, as described in greater detail with respect to FIG. 5 below. In such a way, the eNodeB (e.g., 361 or 370) may function as a network switch to route data between BBUs (e.g., 365, 369, or 374) and the 4G EPC 350 or the 5G gNodeB 390. Performing such network switch functionality, the eNodeB (e.g., 361 or 370) in such an embodiment may route a certain traffic load, and each eNodeB (e.g., 361 or 370) may be assigned an adjustable maximum traffic load.

Some portions of the infrastructure within the 4G EPC 350 and its functionality in an embodiment may be proprietary, and not scalable by the enterprise. In contrast, as described in greater detail with respect to FIG. 5, the 5G core may operate as a plurality of containerized software applications, many or all of which may be managed, scaled, and orchestrated by the MANO 320. In some embodiments, certain portions of the infrastructure within the 4G EPC 350 may be scalable, however, including the Serving Gateway (S-GW) 303, and the Packet Data Network Gateway (P-GW) 305.

The eNodeB 370 in an embodiment may exchange messages with the mobility management entity (MME) 301 in an embodiment via an S1-MME interface 376 adhering to the General Packet Radio Service Tunneling Protocol for the user-plane (GTP-U). The MME 301 may communicate with the Home Subscriber Server (HSS) 312 via an S6A interface 319 to authenticate each of the pool of UEs 340. The HSS 312 in an embodiment may comprise a central database that contains user-related and subscription-related information and UE policy information, as described in greater detail below. The MME 301 may then perform tasks relating to activating and deactivating wireless links with specifically identified (e.g., by eSIM) UEs within pool 340, and authorizing access to one of a plurality of available serving gateways (e.g., 303) to process data packets or data frames exchanged via wireless links with the pool of UEs 340.

Upon authorization and activation of one or more of the UEs in the pool 340 via the MME 301 in an embodiment, the MME 301 may notify the serving gateway (S-GW) 303 that the such UEs in pool 340 have been authenticated via S11 interface 302. The S-GW 303 in an embodiment may receive user data packets from the eNodeB (e.g., 370) via an S1-U interface 375, and route and forward those user data packets to the Packet Data Network Gateway (P-GW) 305 via S5 connection 304. In such a way, the S-GW 303 may function as a network switch to route data between BBUs (e.g., 365, 369, or 374) and the P-GW 305. Performing such network switch functionality, the S-GW 303 in such an embodiment may route a certain traffic load, and may be assigned an adjustable maximum traffic load.

Transmission of data packets between the S-GW 303 and the P-GW 305 in an embodiment may be through a fiber-optic cable or bus using an S5 interface, for example. The P-GW 305 in an embodiment provides connectivity between the pool of UEs 340 and the remote cloud network 380. Data packets received from the UEs 340 at the P-GW 305 in an embodiment may be encapsulated within IP packets for transmission to the remote cloud network 380. The P-GW 305 may transceive IP packets with the remote cloud network 380 via a fiber-optic cable or bus using an SGi interface 316. Headers for IP packets received at the P-GW 305 from the remote cloud network 380 may be stripped from encapsulated data packets, and the stripped data packets may be forwarded to the S-GW 303 for transmission to UEs within the pool 340 via the eNodeB (e.g., 370). In such a way, the P-GW 305 may function as a network switch to route data between S-GW 303 and a remote cloud network 380. Performing such network switch functionality, the P-GW 305 in such an embodiment may route a certain traffic load, and may be assigned an adjustable maximum traffic load.

The 4G EPC 350 in an embodiment may comprise a plurality of S-GWs (e.g., 303) and P-GWs (e.g., 305). Each S-GW (e.g., 303) and P-GW (e.g., 305) in an embodiment may operate as a containerized software application. The number of S-GWs (e.g., 303) and P-GWs (e.g., 305) executing at the 4G EPC 350 in an embodiment may be dictated by a preset replication rate. The performance of the S-GWs (e.g., 303) and P-GWs (e.g., 305) in an embodiment may further be impacted by a preset processor call priority setting which dictates the priority with which a processor may execute calls from such S-GW (e.g., 303) and P-GW (e.g., 305). In other words, a higher processor call priority setting may result in an S-GW (e.g., 303) or P-GW (e.g., 305)

processing a higher volume of data packets over a certain time period than another S-GW (e.g., 303) or P-GW (e.g., 305) with a lower processor call priority setting.

Each BBU (e.g., 365, 369, or 374), S-GW 303, or P-GW 305 in an embodiment may be associated with various performance requirements. In addition, each eNodeB (e.g., 361 or 370), the entirety of the 4G RAN 360, and the 4G EPC 350 may also be associated with performance requirements. For example, each BBU (e.g., 365, 369, or 374), S-GW 303, or P-GW 305 in an embodiment may be associated with a maximum processor utilization rate capping the percentage of processing resources accessible by that BBU (e.g., 365, 369, or 374), S-GW 303, or P-GW 305. As another example, the eNodeB (e.g., 361 or 370), the 4G RAN 360, and the 4G EPC 350 may be associated with a guaranteed bit rate (GBR) defining a portion of network and processing resources set aside or reserved for executions of those systems. If the performance metrics for the eNodeB (e.g., 361 or 370), the 4G RAN 360, and the 4G EPC 350 in an embodiment indicate any of those systems are not consuming the network or processing resources set aside according to the GBR, this may indicate an adjustment to the infrastructure component configuration may be needed. In other words, this may indicate a need to adjust the processing resources allocated to the eNodeB (e.g., 361 or 370), the 4G RAN 360, or the 4G EPC 350, to adjust changes to the data connection to accommodate the pool of UEs 340 seeking access.

The P-GW 305 in an embodiment may also perform enforcement of rules generated by the policy/charging rules function (PCRF). The PCRF 307 in an embodiment may generate policy and charging rules containing charging-related information and Quality of Service (QoS) parameters used in bearer establishment. These policies may inform or dictate the types of wireless communication networks with which each UE associated with a given policy may establish wireless connections, based on link performance requirements, security requirements, types of networks supported by a given UE, or other factors in various embodiments. These policies may be transmitted to the P-GW via a fiber-optic cable or bus using an S-6A interface 318 from the HSS 312, then transmitted to the PCRF 307 via a fiber-optic cable or bus using a Gx interface 306, for example.

The policies pursuant to which the PCRF 307 in an embodiment may establish the rules enforced by the P-GW 305 may be stored at the HSS 312, with each UE within the pool 340 being associated with one or more of such stored policies. For example, a single UE within the pool 340 in an embodiment may be associated with a policy stored at the HSS 312 that specifies the types of wireless communication networks (e.g., 3G, 4G, 5G, Wi-Fi, Wi-Max, BlueTooth®, Near Field Communications (NFC), etc.) with which the UE associated with that policy may be capable of establishing wireless links depending on network conditions determined by the MANO 320 and the adaptive dynamic smart wireless infrastructure control system 321. As another example, such a policy may identify whether a given UE supports 5G network slicing capabilities. As yet another example, such a policy may identify a given UE's preference of one type of wireless communication network over another (e.g., preference of cellular over Wi-Fi, preference of 5G over 4G, preference of Wi-Max over Wi-Fi, etc.), or preference of one type of cellular network core over another (e.g., preference of processing wireless signals through the 5G core rather than the 4G core). In yet another example, such a policy may identify one or more policy-based connectivity requirements. More specifically, a UE may be associated with a minimum threshold requirement for signal strength, throughput, latency, or other wireless connectivity performance metrics for establishing wireless links and may be utilized by the adaptive dynamic smart wireless infrastructure control system 321 to determine end-to-end data connection resources and enterprise mobile network infrastructure used and allocated to 4G RAN and the EPC core.

In still another example, such a policy may identify one or more security levels with which a given UE may be associated. Such security levels may be assigned to each UE by an IT professional of the enterprise operating the enterprise mobile network, and may be adjustable or dynamically adaptable based on real-time metrics describing the usage, location, or movement of the UE. For example, use of specific applications may cause the UE to be associated with a higher level of security needed to protect transmission of information pursuant to execution of such programs. As another example, location of the UE on a campus or a specific sub-portion of a campus for the enterprise may cause the UE to be associated with a higher level of security. As yet another example, movement of the UE within the campus may indicate the device is mobile, and thus, less likely to require a higher level of security reserved for stationary desktop devices located within secure areas of the campus. In still other examples, the role of the UE user may dictate the assigned security level, such that employees regularly engaging in transfer of sensitive data (e.g., confidential technical information, confidential legal or accounting information, etc.) may be assigned a higher security rating than an individual not regularly transferring such data.

The P-GW 305 in an embodiment may also act as a gateway between the 4G EPC 350 and an access point transceiving data according to a non-cellular or non-3GPP standard, such as a WLAN or Bluetooth® network. For example, a UE within the pool 340 may establish a wireless link with a non-cellular access point 330, through which a GTP-U tunnel 317 to an evolved packet data gateway (ePDG) 311 of the 4G EPC 350 may be established. The ePDG 311 in such an embodiment may receive IP packets from the pool of UEs 340 via this GTP-U tunnel 317. The ePDG 311 may communicate with the authorization, authentication, accounting module (AAA) 314 via a fiber-optic cable or bus using an SWm interface 315 to authenticate the UE within the pool 340 with which the GTP-U tunnel 317 has been established. The AAA may be in communication with the stored UE subscriber information in the HSS 312 via a fiber-optic cable or bus using an SWx interface 313. Upon such an authentication, the ePDG 311 may forward the received IP packets to the P-GW 305 via an IP session tunnel 310. As with data packets received via the eNodeB (e.g., 370) in an embodiment described directly above, the P-GW 305 may then transmit these received IP packets to the remote cloud network 380 or MEC resources via a fiber-optic cable or bus using the SGi interface 316. Similarly, the P-GW 305 may receive IP packets via the SGi interface 316 from the remote cloud network 380, then forward those IP packets to the UE pool 340 via the ePDG 311 and the non-cellular AP 330. In such a way, a UE within the pool 340 may establish a wireless link to the 4G EPC 350 (and ultimately to the remote cloud network 380 or MEC resources) via either the eNodeB of the 4G RAN or the non-cellular AP 330.

As described herein, the enterprise mobile network in an embodiment may be managed by a single entity or enterprise, and may include a plurality of RANs (e.g., 4G RAN 360, or 5G RAN described with reference to FIG. 4 below), cellular network cores (e.g., 4G Evolved Packet Core 350, or 5G core described with reference to FIG. 5 below), and non-cellular access points (e.g., WLAN or BlueTooth® AP 330). Each UE within pool 340 may be capable of establishing a wireless link with a RAN (e.g., 4G RAN 360, or 5G RAN described with reference to FIG. 4 below), or a non-cellular AP (e.g., WLAN or BlueTooth® AP 330) in an embodiment. Wireless connectivity metrics for each wireless link may vary based on the type of RAN or AP with which a UE has established such a link. For example, a wireless link between a UE within pool 340 and 4G RAN 360 may provide greater throughput than a wireless link between that UE and the WLAN/BT AP 330, while the wireless link between that UE and the WLAN/BT AP 330 provides lower latency. This is only one of many possible comparisons between wireless connectivity metrics of wireless links established between a UE within pool 340 and any given RAN or AP in various embodiments. Other connectivity metrics that may be considered for comparison between two wireless links may include, for example, security of the wireless link, signal strength, percentage of dropped packets, or another wireless connectivity metric routinely monitored, recorded, or stored at a UE within pool 340, at the HSS 312, at the MANO 320, or at the adaptive dynamic smart wireless infrastructure control system 321, as described herein. Thus, choice of the RAN or AP through which communications between a UE in the pool 340 and the remote cloud network 380 or MEC resources may be routed may impact overall connectivity metrics of such communications.

A 5G RAN may be capable of transceiving data with a 5G network core (e.g., as described with reference to FIGS. 3 and 4 below), while a 4G RAN (e.g., 360) may be capable of transceiving data with either a 4G EPC 350 or a 5G core. For example, the 4G RAN 360 may transceive data with a 5G gNodeB 390 within a 5G RAN via an X2 interface 391 in an embodiment. Further, a non-cellular AP (e.g., 330) may be capable of transceiving data with a plurality of available cellular network cores (e.g., 4G Evolved Packet Core 350, or 5G core described with reference to FIG. 5 below). Processing performed at any core (e.g., EPC 350 or a 5G core described with reference to FIG. 5 below) may impact overall connectivity metrics between a UE within pool 340 and the remote cloud network 380 or MEC metrics. For example, high traffic, high processing utilization, or high rates of node failure at a given core may increase latency, decrease throughput, or otherwise negatively impact the overall communication between such a UE within pool 340 and the remote cloud network 380 or MEC metrics. As another example, routing of communications between such a UE within pool 340 and the remote cloud network 380 or MEC metrics through a specific network slice (e.g., as described in greater detail with respect to FIG. 5 below) may increase throughput, decrease latency, provide heightened security, or otherwise positively impact the overall communication between such a UE within pool 340 and the remote cloud network 380 or MEC metrics. Thus, choice of cellular core through which communications between a UE in the pool 340 and the remote cloud network 380 or MEC metrics may be routed may impact overall connectivity metrics of such communications.

The ways in which each of these connectivity metrics impacts quality of communications between the pool 340 of UEs and the remote cloud network 380 or MEC metrics, as routed through various components of the enterprise mobile network may vary over time as the applications executed by these UEs changes, various UEs enter or leave the pool 340 of linked UEs, the capabilities of the UEs within the pool 340 changes (e.g., more 4G capable UEs enter and more 5G capable UEs exit), or the locations of various UEs within the pool 340 changes. The adaptive dynamic smart wireless infrastructure control system 321 in an embodiment addresses these issues by routinely assessing the communication needs for the pool 340 of UEs wirelessly linked to the enterprise mobile network operating a plurality of cellular and non-cellular RANs (e.g., including 4G RAN 360), APs (e.g., including AP 330), and network cores (e.g., including 4G EPC 350) and adjusting availability of resources at each of these RANs, APs, and cores to meet UE needs. For example, the adaptive dynamic smart wireless infrastructure control system 321 may determine one or more adjustments that may be made to the distribution of computing resources or antenna systems predicted to satisfy performance requirements and UE connectivity requirements, as described in greater detail with respect to FIGS. 7-9 below.

The Management and Orchestration Module (MANO) 320 in an embodiment may operate as a virtual machine or containerized software application of a computing node at the enterprise mobile network in an embodiment. The MANO 320 may orchestrate availability of computing resources for execution of various RAN computing nodes (e.g., eNodeBs such as 361 and 370) and various services or network functions within a 5G core or MEC computing resources or in a remote cloud network 380, as described in greater detail with respect to FIG. 5, below.

The MANO 320 in an embodiment may communicate with the 4G RAN 360, the 4G EPC 350, the 5G RAN (e.g., as described with reference to FIG. 4, below), the 5G core (e.g., as described with reference to FIG. 5, below), and the WLAN/BlueTooth® AP 330 to gather performance metrics, performance requirements, connectivity metrics, policy-based connectivity requirements, infrastructure component configurations, and internetwork connectivity configurations for each of these systems, and connected UEs within the pool 340. For example, the MANO 320 in an embodiment may gather performance metrics from the 4G RAN 360 measuring current uplink loads at each RRU (e.g., 363, 367, or 372), rates at which each of the BBUs (e.g., 365, 369, or 374) are utilizing processing resources, and traffic loads at each of the BBUs. As another example, the MANO 320 may gather infrastructure component configurations for the 4G RAN 360 describing the number of currently active antennas (e.g., 362, 366, and 371) within the 4G RAN 360, and current replication rate and processor call priority for each of the BBUs (e.g., 365, 369, and 374) in the 4G RAN 360. As another example, the MANO 320 in an embodiment may gather performance metrics from the 4G EPC 350 measuring traffic loads at the S-GW 303 and the P-GW 305, and the rates at which each of the S-GWs (e.g., 303) and P-GWs (e.g., 305) are utilizing processing resources. In yet another example, the MANO 320 may gather infrastructure component configurations for the 4G EPC 350 describing current replication rates and processor call priorities for each of the S-GWs (e.g., 303) and P-GWs (e.g., 305).

In another example, the MANO 320 in an embodiment may gather performance requirements for the eNodeB (e.g., 361 or 370), 4G RAN 360 or the 4G EPC 350, such as guaranteed bit rates (GBRs) defining processing resources reserved for performance of the eNodeB (e.g., 361 or 370), 4G RAN 360 or the 4G EPC 350. In still another example, the MANO 320 in an embodiment may gather internetwork connectivity configurations defining network loads on switches connecting specific RANs, or non-cellular APs to specific cellular network cores. More specifically, such internetwork connectivity configuration information may describe the network load on a switch (e.g., BBUs 365, 369, or 374) connecting the 5G gNodeB 390 of the 5G RAN to the eNodeB 361 of the 4G RAN 360, the load on a switch (e.g., S-GW 303) connecting the 4G RAN 360 to the 4G EPC 350, and the load on a switch (e.g., P-GW 305) connecting the 4G EPC 350 to a remote cloud network 380 or MEC computing resources. Traffic loads at these specific switches may illustrate not only performance of the switch itself, but also any potential bottlenecks in data packet transmission that may be remedied by adjusting the flow of traffic through these various systems.

Further, each UE in the pool 340 may communicate with the MANO 320 (e.g., either through wired connection, wireless connection with the 4G RAN 360, 5G RAN, or AP 330, or out-of-band (OOB) communications) to share gathered connectivity metrics for wireless links established by that UE, performance metrics describing currently executing software applications at the UE, security requirements for UE wireless communication, power consumption metrics at the UE, processor consumption or other performance metrics at the UE, connectivity requirements, or UE location data. UE location data may include information identifying one or more antennas (e.g., 362, 366, or 371) that are within range of the UE, as well as GPS or other geographical location information. Connectivity requirements for those UEs may include a need for wireless links of a minimum throughput value, or a maximum latency value. These minimum throughput values, maximum latency values, or other Quality of Service (QoS) requirements, and security settings for such a UE may also be stored within policies at the HSS 312 in an embodiment. In such an embodiment, the adaptive dynamic smart wireless infrastructure control system 321 may retrieve these policies directly from the PCRF 307.

Figure 7:
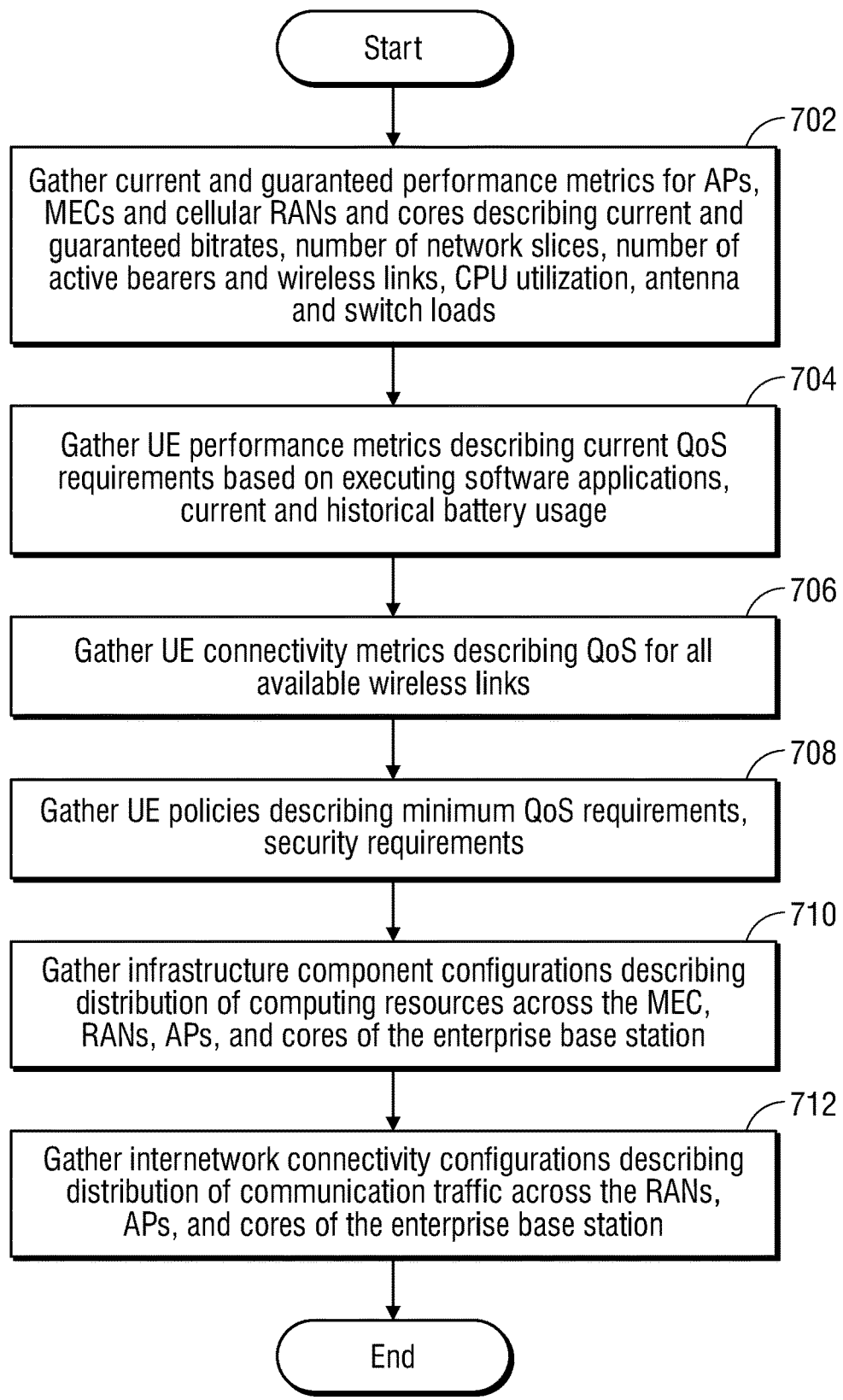
FIG. 7 is a flow diagram illustrating a method of gathering various metrics, requirements, and configuration information for input into a trained neural network according to an embodiment of the present disclosure.
Figure 8:
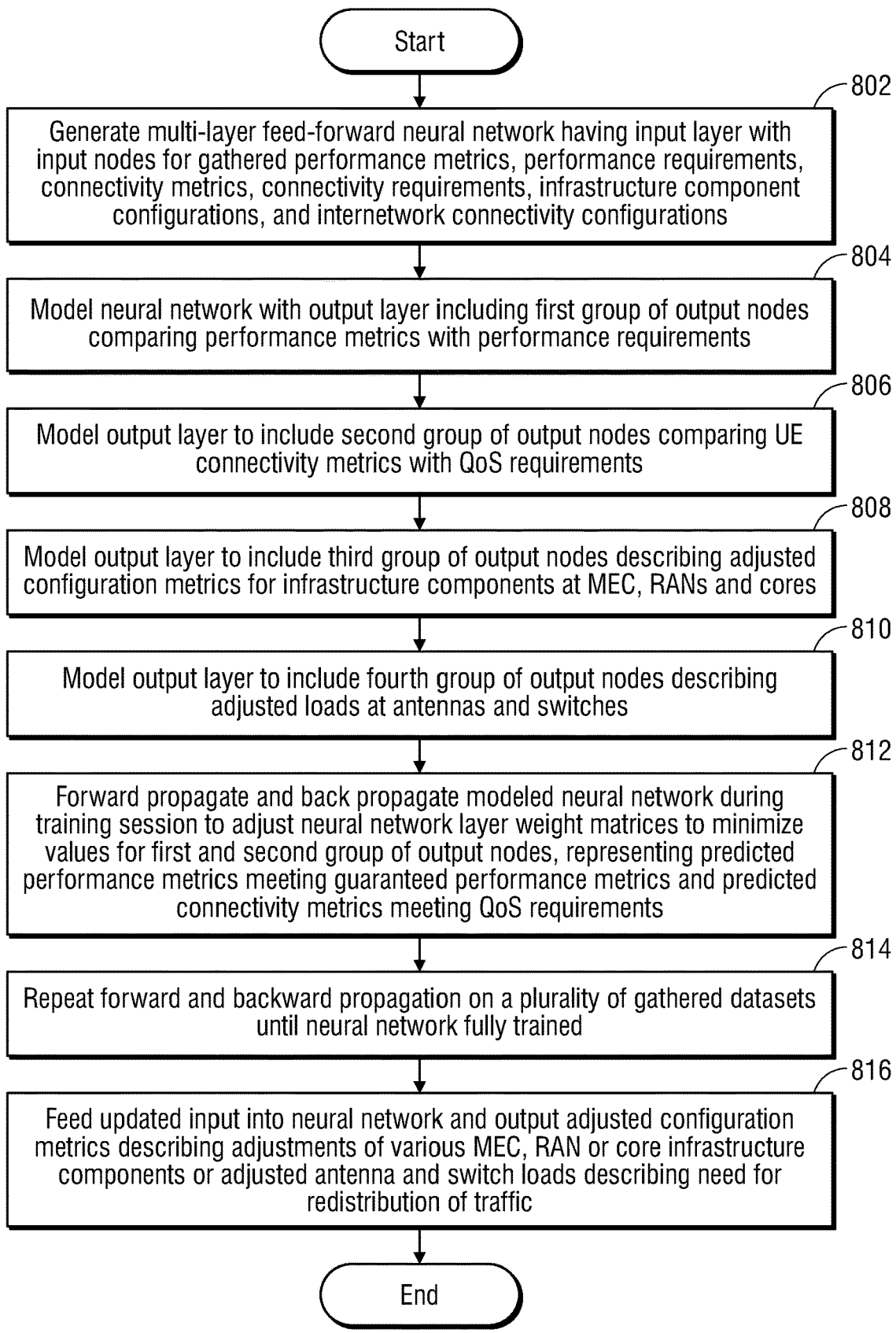
FIG. 8 is a flow diagram illustrating a method of determining adjusted infrastructure component configurations or adjusted internetwork connectivity configurations according to an embodiment of the present disclosure.

The adaptive dynamic smart wireless infrastructure control system 321 in an embodiment may access these gathered performance metrics, performance requirements, connectivity metrics, policy-based connectivity requirements, infrastructure component configurations, and internetwork connectivity configurations from the MANO 320, and output adjusted infrastructure component configurations or adjusted internetwork connectivity configurations predicted to satisfy infrastructure performance guarantees and UE connectivity QoS requirements, as described in greater detail with respect to FIGS. 7-9 below. Adjusted infrastructure component configurations in an embodiment may define adjustments to the distribution of computing resources or antenna systems. Adjusted internetwork connectivity configurations in an embodiment may define adjustments to the distribution of traffic among the UE pool 340, 4G RAN 360, 5G RAN, non-cellular AP 330, 4G EPC 350, and 5G core.

The adaptive dynamic smart wireless infrastructure control system 321 may transmit instructions to the MANO 320 to perform one or more of these determined adjustments in some embodiments. In other embodiments, the adaptive dynamic smart wireless infrastructure control system 321 may transmit an instruction to the PCRF 307 via an Rx interface 322 to adjust policies for one or more UEs in pool 340 stored at the HSS 312. For example, in an embodiment in which the adjusted internetwork connectivity configuration includes an adjustment to traffic load at a specific network switch (e.g., illustrating a potential bottleneck in data packet transmission that may be remedied by adjusting the flow of traffic), the MANO 320 may identify one or more APs (e.g., 330) capable of establishing communication with the 4G EPC 350 and one or more specifically identified UEs in the pool 340. In such an embodiment, the MANO 320 may initiate or instruct those specifically identified UEs in the pool 340 to terminate their wireless links with the 4G RAN 360 and to establish wireless links with the AP 330 and the 4G EPC 350. This may be achieved, at least in part, by the MANO 320 adjusting the policies for each of these specifically identified UEs at the HSS 312 to prioritize wireless links with the AP 330 over wireless link with the 4G RAN 360.

The MANO 320 in an embodiment may operate to increase or decrease the computing resources dedicated to operation of various aspects of the 4G RAN 360 in an embodiment, based on such adjustments determined by the adaptive dynamic smart wireless infrastructure control system 321. For example, the MANO 320 may increase or decrease the number of active antennas (e.g., 362, 366, or 371) to adjust the uplink load across the plurality of active RRUs (e.g., 363, 367, or 372). As another example, the MANO 320 may increase or decrease the replication rate or processor call priority setting for one or more BBUs (e.g., 365, 369, or 374) to adjust the network switch traffic load across the plurality of active BBUs (e.g., 365, 369, or 374). As yet another example, the MANO 320 may increase or decrease the replication rate or processor call priority setting for one or more S-GWs (e.g., 303) to adjust the network switch traffic load between the 4G RAN 360 and the 4G EPC 350. As still another example, the MANO 320 may increase or decrease the replication rate or processor call priority setting for one or more P-GWs (e.g., 305) to adjust the network switch traffic load between the 4G EPC 350 and a remote cloud network 380 or MEC computing resources.

The MANO 320 in an embodiment may operate to reroute or redistribute traffic from wireless links with the UE pool 340 in an embodiment, based on such adjusted internetwork connectivity configurations determined by the adaptive dynamic smart wireless infrastructure control system 321. For example, the adjusted internetwork connectivity configurations may indicate a need to increase or decrease the network load at a specific switch connecting a cellular network core to a RAN, a non-cellular AP, or to a remote cloud network 380 or MEC computing resources. More specifically, the adjusted internet connectivity configuration in one example may indicate a need to decrease network load at one or more of BBUs (e.g., 365, 369, or 374) connecting the 4G RAN 360 to the 4G EPC 350. In such an example embodiment, the MANO 320 may redirect traffic from one or more UEs in the pool 490 transceiving data through the 4G RAN 360 in such a way to connect to the 4G EPC 350 via the AP 330. In another example, the adjusted internet connectivity configuration may indicate a need to decrease network load at S-GW 303 connecting the 4G RAN 360 to 4G EPC 350 or P-GW 305 connecting the 4G EPC 350 to a remote cloud network 380 or MEC computing resources. In such an example embodiment, the MANO 320 may redirect traffic being transceived to the 4G EPC 350 by the 4G RAN 360 by instructing the 4G RAN 360 to transceive data through the 5G core instead of the 4G EPC 350.

FIG. 4 is a block diagram illustrating a 5G Radio Access Network (RAN) 480 of an enterprise 5G communication system according to an embodiment of the present disclosure. Some or all components of the 5G RAN 480 may be located at an enterprise mobile network (e.g., comparable to that discussed directly above with respect to FIG. 3) in some embodiments. More specifically, the enterprise mobile network in an embodiment may incorporate or access a cloud native RAN Intelligent Controller (RIC) 441 operating to coordinate communication of data through a plurality of logical 5G radio nodes (gNodeBs) (e.g., 450). In some embodiments, one or more of such gNodeBs (e.g., 450) may be co-located with the RIC 441 within the enterprise mobile network. In other embodiments, one or more of such gNodeBs (e.g., 450) may be separated into one or more facilities separate from the RIC 441, in accordance with the decentralized architectural approach for which the 5G communication standard was designed, as described in greater detail below.

As described herein, user equipment devices (UEs) within a pool 490 may communicate via one or more wireless links established by an antenna system of the UE within the enterprise mobile network incorporating infrastructure for establishing wireless links via a plurality of wireless communications standards, such as, for example, 4G cellular, 5G cellular, or non-cellular protocol such as Wi-Fi, or Bluetooth®. In such cases, a single enterprise mobile network may establish wireless links with a pool 490 of UEs via one or more of a 4G RAN (e.g., as described with reference to FIG. 3 above), a 5G RAN 480, or a non-cellular wireless communication AP (e.g., as described with reference to FIGS. 2 and 4). Further, communications received at each of the 4G RAN, 5G RAN 480, and non-cellular wireless communication AP may be routed to a remote cloud network 473 or local MEC resources via either a 4G EPC (e.g., as described with reference to FIG. 3 above) or a 5G core 470, with each core located within the enterprise mobile network. FIG. 4 illustrates a 5G RAN 480 communicably linked to a pool of UEs 490, a 4G eNodeB 408 and a 5G core 470 to establish wireless communications according to the 5G standard with the pool of UEs 490.

The 5G communication standard increases the frequency bands available for the establishment of wireless links to include frequencies below 1 GHz and above 60 GHz (e.g., 5G mmWave). Some of these frequency bands operate best within short distances between the UE pool 490 and the antenna system (e.g., 401, 402, or 405) with which a wireless link has been established. In order to provide similar coverage to 4G systems, 5G systems may provide several antenna systems (e.g., 401, 402, or 405) spread over an area serviced by a single 4G RAN (e.g., as described above with reference to FIG. 3). This 5G strategy may provide more complete coverage (e.g., by placing a 5G antenna within an area with poor connectivity to the 4G RAN), with greater bandwidth availability than 4G (e.g., within the 5G mmWave frequencies). In order to make this 5G solution economically feasible, ETSI designed the 5G standard to decentralize the functionality of the RAN into various components that may or may not be co-located with one another, to decrease the size and cost of each 5G cell. This decentralization and movement of RAN components to a plurality of locations within a single cell results in the ability to push some computing overhead involved in transceiving of data packets between the UE pool 490 and a remote cloud network 473 or MEC resources away from the centralized RAN or core (e.g., as described in the 4G RAN 360 of FIG. 3) and towards the "edge" of the network that include the antenna systems.

The 5G RAN 480 in an embodiment may comprise one or more logical 5G radio nodes (gNodeBs) (e.g., 450). A single gNodeB in an embodiment may comprise a logical architecture of several components, including a Radio Unit (RU) (e.g., 403 and 406), a Distributed Unit (DU) (e.g., 410 and 412), and a Centralized Unit (CU) node (e.g., 430). Each of these components may be co-located with one another in a single physical structure, or located in separated locations, connected to one another via fiber optical cables, for example. The locations of each of these components with respect to one another may be a reflection of the degree to which the 5G RAN 480 pushes processing overhead toward the edges of the network. For example, locating the RU (e.g., 403 and 406), DU (e.g., 410 and 412), and CU (e.g., 430) together may provide a centralized architecture that pushes all overhead for gNodeB 450 to a single physical location (e.g., server rack or server farm). As another example, locating the RU (e.g., 403 and 406), DU (e.g., 410 and 412), and CU (e.g., 430) each in separate facilities housing separate server racks may provide a fully distributed architecture that pushes all RU and DU processing overhead to the outer edges of the network. Although FIG. 4 depicts a single gNodeB 450, the 5G RAN 480 in other embodiments may incorporate a plurality of gNodeBs.

The 5G RAN 480 in an embodiment may perform many of the same functions of the 4G RAN described above with reference to FIG. 3, but differs from the 4G RAN in that it decouples the functionality of the 4G RRU and the 4G BBU to allow for the decentralization described directly above, as well as for optimized distribution of processing capacity across a plurality of gNodeBs (e.g., 450). UEs within pool 340 in an embodiment may establish wireless links with Radio Units (e.g., 403 and 406) of the 5G RAN 480. Each RU (e.g., 403 or 406) may be co-located with and service one or more antenna systems (e.g., 401, 402, or 405). For example, RU 403 may service a plurality of antenna systems 401 and 402, while RU 406 services a single antenna system 405. The RUs (e.g., 403 and 406) in an embodiment may comprise an RF transmitter and a LO PHY processing block for processing of the lower physical layer of cellular data frames from the UE pool 490. In such a way, each RU (e.g., 403 or 406) in an embodiment may operate as network interface device capable of processing a maximum uplink load according to an adjustable load setting.

In an embodiment in which RU 403 services two antennas 401 and 402 and RUs 403 and 406 have access to the same processing resources, the amount of time required for RU 403 to perform this processing on signals transceived via both antennas 401 and 402 may be greater than the amount of time required for RU 406 to perform this same processing on signals transceived via antenna 405 alone. Thus, increasing the number of antennas (e.g., 401 and 402) serviced by a single RU 403 in an embodiment may increase the latency of communication between the UE pool 490 and a remote cloud network 473 or MEC resources. However, servicing two antennas (e.g., 401 and 402) via a single RU (e.g., 403) in an embodiment may increase the throughput of wireless links established with RU 403. Because each RU (e.g., 403 and 406) in an embodiment may service a separate physical space, this may be preferable when demand for wireless links within a given geographic area (e.g., density of UEs within a 5G cell) increases.

Each RU (e.g., 403 or 406) may be in communication with a Distributed Unit (DU) (e.g., 410, or 412, respectively) via a fronthaul (e.g., 404 or 407, respectively) interface. Each DU (e.g., 410 or 412) in an embodiment may comprise a HI PHY block for processing the higher physical layer of cellular data frames received from the RU (e.g., 403 or 406, respectively), a Media Access Control (MAC) block for processing the MAC layer of the received cellular data frame, and a Radio Link Control (RLC) block for processing the RLC layer of the received cellular data frame. The RUs (e.g., 403 or 406) may be co-located with the DUs (e.g., 410 or 412) in some embodiments. In other embodiments, the DUs (e.g., 410 or 412) may be located in physically separate facilities that are connected to the RUs (e.g., 403 or 406) via the fronthaul connections 404 and 407, respectively. Each DU (e.g., 410 or 412) in an embodiment may operate as a containerized software application. The number of DUs (e.g., 410 or 412) executing at any given gNodeB (e.g., 450), or across the entire 5G RAN 480 in an embodiment may be dictated by a preset DU replication rate. The performance of the DUs (e.g., 410 or 412) in an embodiment may further be impacted by a preset processor call priority setting which dictates the priority with which a processor may execute calls from such DUs. In other words, a higher processor call priority setting may result in a DU processing a higher volume of data packets over a certain time period than another DU with a lower processor call priority setting.

All DUs (e.g., 410 and 412) within gNodeB 450 in an embodiment may be in communication with a single centralized unit (CU) node 430 via an F1 mid-haul connection (e.g., 411 and 413, respectively). In a split gNodeB 450 embodiment, one or more of the DUs (e.g., 410 or 412) may be linked to the CU node 430 in a separate physical location. The CU node 430 may receive IP packets from the DUs 410 and 412 and separate those packets into either control plane or user plane packets. As described above with respect to FIG. 3, the gNodeB 450 or the 5G RAN 480 may also receive IP packets from an eNodeB 408 of a 4G RAN, to facilitate processing of the 4G RAN originated IP packets via the 5G Core 470. In such an embodiment, the CU node 430 may receive IP packets from the 4G eNodeB 408 via an X2 side-haul 409, and similarly separate those packets into either control panel or user plane packets. In such a way, the DU 412 may function as a network switch to route data between the 4G eNodeB 408 of the 4G RAN and the 5G core 470. Performing such network switch functionality, the DU 412 in such an embodiment may route a certain traffic load, and each DU 412 may be assigned an adjustable maximum traffic load.

The CU node 430 may comprise one or more centralized units (CUs) (e.g., 431 and 433) in an embodiment, primarily operating to split transceived data into a control plane and a user plane. The Control Plane CU (CU-C) 433 in an embodiment may perform control plane functions in order to successfully route and process data packets to the 5G core 470. These functions may include enforcing policies and protocols, identifying packets to be discarded, granting preferential treatment of certain packets for which a high QoS is defined, establishing a user plane session, and ending a user plane session. The User Plane CU (CU-U) 431 in an embodiment may perform user plane functions such as messaging between applications running at endpoints of the wireless communication links (e.g., cloud-based applications within a remote cloud network 473 or at MEC resources and UEs within pool 490) in order to facilitate execution of these endpoint software applications. Separating these functions into the user plane and the control plane may optimize the user plane for simplicity, regularity, and speed of processing inter-application requests via transmission of data packets while optimizing the control plane for customizability and scalability. Each CU (e.g., 431 or 433) in an embodiment may operate as a containerized software application. The number of CUs (e.g., 431 or 433) executing across the entire 5G RAN 480 in an embodiment may be dictated by a preset CU replication rate. The performance of the CUs (e.g., 431 or 433) in an embodiment may further be impacted by a preset processor call priority setting which dictates the priority with which a processor may execute calls from such CUs. In other words, a higher processor call priority setting may result in a CU processing a higher volume of data packets over a certain time period than another CU with a lower processor call priority setting.

Each DU (e.g., 410, or 412) and CU (e.g., 431 or 433) in an embodiment may be associated with various performance requirements. In addition, each gNodeB (e.g., 450), the entirety of the 5G RAN 480, and the 5G core may also be associated with performance requirements. For example, each DU (e.g., 410 or 412) and CU (e.g., 431 or 433) in an embodiment may be associated with a maximum processor utilization rate capping the percentage of processing resources accessible by that DU (e.g., 410 or 412) or CU (e.g., 431 or 433). As another example, the gNodeB 450, 5G RAN 480, or 5G core 470 may be associated with a guaranteed bit rate (GBR) defining a portion of network and processing resources set aside or reserved for executions of those systems. If the performance metrics for the gNodeB 450, 5G RAN 480, or 5G core 470 in an embodiment indicate any of those systems are not consuming the network or processing resources set aside according to the GBR, this may indicate an adjustment to the infrastructure component configuration may be needed. In other words, this may indicate a need to adjust the processing resources allocated to the gNodeB 450, 5G RAN 480, or 5G core 470.

The CU node 430 in an embodiment may service one or more DUs (e.g., 410 and 412). As the number of DUs (e.g., 410 and 412) serviced by the CU node 430 increases, the latency and throughput at such a CU node 430 may also increase. In contrast, as the number of DUs (e.g., 410 and 412) serviced by the CU node 430 decreases, latency and throughput at such a CU node 430 may also decrease. Thus, operations at each CU node (e.g., 430) within a 5G RAN 480 in an embodiment may be optimized for greater throughput or lower latency, dependent upon the needs of the pool of UEs 490, by increasing or decreasing the number of DUs (e.g., 410 and 412) serviced by each CU node 430.

The 5G standard has been developed to allow for open-source software solution performance of the various functions of the RU (e.g., 403 and 406), DU (e.g., 410 and 412), and CU Node 430 on standardized hardware configurations. Each of these open-source software solutions in an embodiment may operate as a containerized software application executing at one or more computing nodes. The enterprise mobile network in an embodiment may employ RIC node 440 to coordinate and optimize execution of each of the DU (e.g., 410 and 412) and CU node 430 functions. The RIC node 440 itself may operate as a containerized software application to distribute capacity across the plurality of DUs (e.g., 410 and 412), and CUs (e.g., including 430), while still meeting QoS requirements for UEs in pool 490. The 5G communication standard employs two different types of RICs, including a near-real-time RIC (RIC near-RT) and a non-real-time RIC (RIC non-RT). The RIC near-RT may perform tasks that require one second or less latency, while the RIC non-RT may perform tasks that are less latency-sensitive. The RIC near-RT may be co-located with the 5G RAN 480 (e.g., at RIC node 440) in order to ensure low-latency processing of data received from the CU node 430. The RIC non-RT may be co-located with the 5G RAN 480 and the RIC near-RT in some embodiments. In other embodiments, the RIC non-RT may be located outside or remotely from the 5G RAN 480, or may be co-located with infrastructure components of the 5G core 470, for example. The RIC node 440 (e.g., incorporating the RIC near-RT) may communicate with the CU node 430 via an E2 Mid-haul 435, and with the DUs (e.g., 410 and 412) via an F1 Mid-haul (e.g., 414 and 415, respectively).

5G RAN 480 gNodeBs (e.g., 450) in an embodiment may transceive data packets for further processing to the 5G core 470. Upon separation of data by the CU Node 430 in an embodiment, data processed by the CU-U 431 may be transmitted to the user plane function 472 of the 5G core 470, via an N3 backhaul connection 432 for establishment of a user session. Data processed by the CU-C 433 in an embodiment may be transmitted to the Access and Mobility Management Function (AMF) 471 of the 5G core 470 via an N2 backhaul connection 434 for execution of several network functions at the 5G core 470, as described in greater detail below with respect to FIG. 5. In such a way, the CU-U 431 and CU-C 433 may function as network switches to route data between the 5G RAN 480 and the 5G core 470. Performing such network switch functionality, the CUs 431 and 433 in such an embodiment may route a certain traffic load, and each CU (e.g., 431 or 433) may be assigned an adjustable maximum traffic load.

As described herein, choice of the RAN or AP through which communications between a UE in the pool 490 and the remote cloud network 473 may be routed may impact overall connectivity metrics of such communications. Further, the ways in which each of these connectivity metrics impacts quality of communications between the pool 490 of UEs and the remote cloud network 473 or MEC resources, as routed through various components of the enterprise mobile network (or portions of gNodeB 450 or 5G RAN 480 located separately from the enterprise mobile network) may vary over time as the applications executed by these UEs changes, various UEs enter or leave the pool 490 of linked UEs, the capabilities of the UEs within the pool 490 changes (e.g., more 4G capable UEs enter and more 5G capable UEs exit), or the locations of various UEs within the pool 490 changes. The adaptive dynamic smart wireless infrastructure control system 475 in an embodiment addresses these issues by routinely assessing the communication needs for the pool 490 of UEs wirelessly communicating within the enterprise mobile network operating or transceiving data with a plurality of cellular and non-cellular RANs (e.g., including at least some portions of 5G RAN 480), APs, and network cores (e.g., including 5G core 470) and adjusting availability of resources at each of these RANs, APs, and cores to meet UE needs. For example, the adaptive dynamic smart wireless infrastructure control system 475 may determine one or more adjustments that may be made to the distribution of computing resources or antenna systems predicted to satisfy infrastructure performance guarantees and UE connectivity QoS requirements, as described in greater detail with respect to FIGS. 7-9 below.

The Management and Orchestration Module (MANO) 474 in an embodiment may orchestrate availability of computing resources for execution of various RAN computing nodes (e.g., gNodeB 450 or portions thereof) and various services or network functions within a 5G core 470, as described in greater detail with respect to FIG. 5, below. The MANO 474 in an embodiment may communicate with the 4G RAN, the 4G EPC, the 5G RAN 480, the 5G core 470, and a WLAN/BlueTooth® AP to gather performance metrics, performance requirements, connectivity metrics, policy-based connectivity requirements, infrastructure component configurations, and internetwork connectivity configurations for each of these systems, and connected UEs within the pool 490. For example, the MANO 474 in an embodiment may gather performance metrics from the 5G RAN 480 measuring current uplink loads at each RU (e.g., 403 and 406), rates at which each of the DUs (e.g., 410 and 412) and CUs (e.g., 431 and 433) are utilizing processing resources, and traffic loads at each of the CUs. As another example, the MANO 474 may gather infrastructure component configurations for the 5G RAN 480 describing the number of currently active antennas (e.g., 401, 402, and 405) within the 5G RAN 480, and current replication rate and processor call priority for each of the DUs (e.g., 410 and 412) and CUs (e.g., 431 and 433).

In another example, the MANO 474 in an embodiment may gather performance requirements for the gNodeB 450, 5G RAN 480 or the 5G core 470, such as guaranteed bit rates (GBRs) defining processing resources reserved for performance of the gNodeB 450, 5G RAN 480, or 5G core 470. In still another example, the MANO 474 in an embodiment may gather internetwork connectivity configurations defining network loads on switches connecting specific RANs, or non-cellular APs to specific cellular network cores. More specifically, such internetwork connectivity configuration information may describe the network load on a switch (e.g., DU 412) connecting the 4G eNodeB 408 of the 4G RAN to the DU 412 of the 5G RAN 480, the load on a switch (e.g., CU-C 433) connecting the 5G RAN 480 to the control plane (e.g., AMF 471) of the 5G core 470, and the load on a switch (e.g., CU-U 431) connecting the 5G RAN 480 to the user plane (e.g., UPF 472) of the 5G core 470. Traffic loads at these specific switches may illustrate not only performance of the switch itself, but also any potential bottlenecks in data packet transmission that may be remedied by adjusting the flow of traffic through these various systems.

Further, each UE in the pool 490 may communicate with the MANO 474 (e.g., either through wired connection, wireless connection with the 4G RAN, 5G RAN 480, or out-of-band (OOB) communications) to share gathered connectivity metrics for wireless links established by that UE, or performance metrics describing currently executing software applications at the UE, security requirements for UE wireless communication, power consumption metrics at the UE, processor consumption or other performance metrics at the UE, or UE location data. UE location data may include information identifying one or more antennas (e.g., 401, 402, or 405) that are within range of the UE, as well as GPS or other geographical location information. Performance metrics describing currently executing software applications at the UE may further describe connectivity requirements for those UEs, including a need for wireless links of a minimum throughput value, or a maximum latency value.

The adaptive dynamic smart wireless infrastructure control system 475 in an embodiment may access these gathered performance metrics, performance requirements, connectivity metrics, policy-based connectivity requirements, infrastructure component configurations, and internetwork connectivity configurations from the MANO 474, and output adjusted infrastructure component configurations or adjusted internetwork connectivity configurations predicted to satisfy infrastructure performance guarantees and UE connectivity QoS requirements, as described in greater detail with respect to FIGS. 7-9 below. Adjusted infrastructure component configurations in an embodiment may define adjustments to the distribution of computing resources or antenna systems. Adjusted internetwork connectivity configurations in an embodiment may define adjustments to the distribution of traffic among the UE pool 490, 4G RAN, 5G RAN 480, non-cellular AP, 4G EPC, and 5G core 470. The adaptive dynamic smart wireless infrastructure control system 475 may transmit instructions to the MANO 474 or RIC 441 to perform one or more of these determined adjustments in some embodiments.

The MANO 474 or RIC 441 in an embodiment may operate to increase or decrease the computing resources dedicated to operation of various aspects of the 5G RAN 480 in an embodiment, based on such adjusted infrastructure component configurations determined by the adaptive dynamic smart wireless infrastructure control system 475. For example, the MANO 474 or RIC 441 may increase or decrease the number of active antennas (e.g., 401, 402, or 405) to adjust the uplink load across the plurality of active RUs (e.g., 403 and 406). In some embodiments, the adjusted infrastructure component configuration output by the adaptive dynamic smart wireless infrastructure control system 475 may specifically identify additional antennas to bring online based on the geographic locations of UEs within pool 490. As another example, the MANO 474 or RIC 441 may increase or decrease the replication rate or processor call priority setting for one or more DUs (e.g., 410 or 412) to adjust the network switch traffic load across the plurality of active DUs (e.g., 410 or 412). As yet another example, the MANO 474 or RIC 441 may increase or decrease the replication rate or processor call priority setting for one or more CUs (e.g., 431 or 433) to adjust the network switch traffic load between the 5G RAN 480 and the 5G core 470. As still another example, the MANO 474 or RIC 441 may increase or decrease the replication rate or processor call priority setting for one or more User Plane Functions (UPFs) 472 to adjust the network switch traffic load between the 5G core 470 and a remote cloud network 473.

The MANO 474 in an embodiment may operate to reroute or redistribute traffic from wireless links with the UE pool 490 in an embodiment, based on such adjusted internetwork connectivity configurations determined by the adaptive dynamic smart wireless infrastructure control system 475. For example, the adjusted internetwork connectivity configurations may indicate a need to increase or decrease the network load at a specific switch connecting a cellular network core to a RAN, a non-cellular AP, or to a remote cloud network or MEC resources. More specifically, the adjusted internet connectivity configuration in one example may indicate a need to decrease network load at DU 412 connecting the 4G eNodeB 408 of the 4G RAN to the DU 412 of the 5G RAN 480. In such an example embodiment, the MANO 474 may redirect traffic from one or more UEs in the pool 490 transceiving data through DU 412 in such a way to connect to the 4G EPC via the 4G eNodeB 408 rather than the 5G core 470. In another example, the adjusted internet connectivity configuration may indicate a need to decrease network load at CU-C 433 connecting the 5G RAN 480 to the control plane (e.g., AMF 471) of the 5G core 470 or to decrease network load the load on CU-U 431 connecting the 5G RAN 480 to the user plane (e.g., UPF 472) of the 5G core 470. In such an example embodiment, the MANO 474 may redirect traffic being transceived to the 5G core 470 by the 5G RAN 480 by instructing some UEs in pool 490 transceiving data through the CU-U 431 and CU-C 433 in such a way to transceive data to the 5G core 470 via a non-cellular AP, rather than through the 5G RAN 480.

Figure 5:
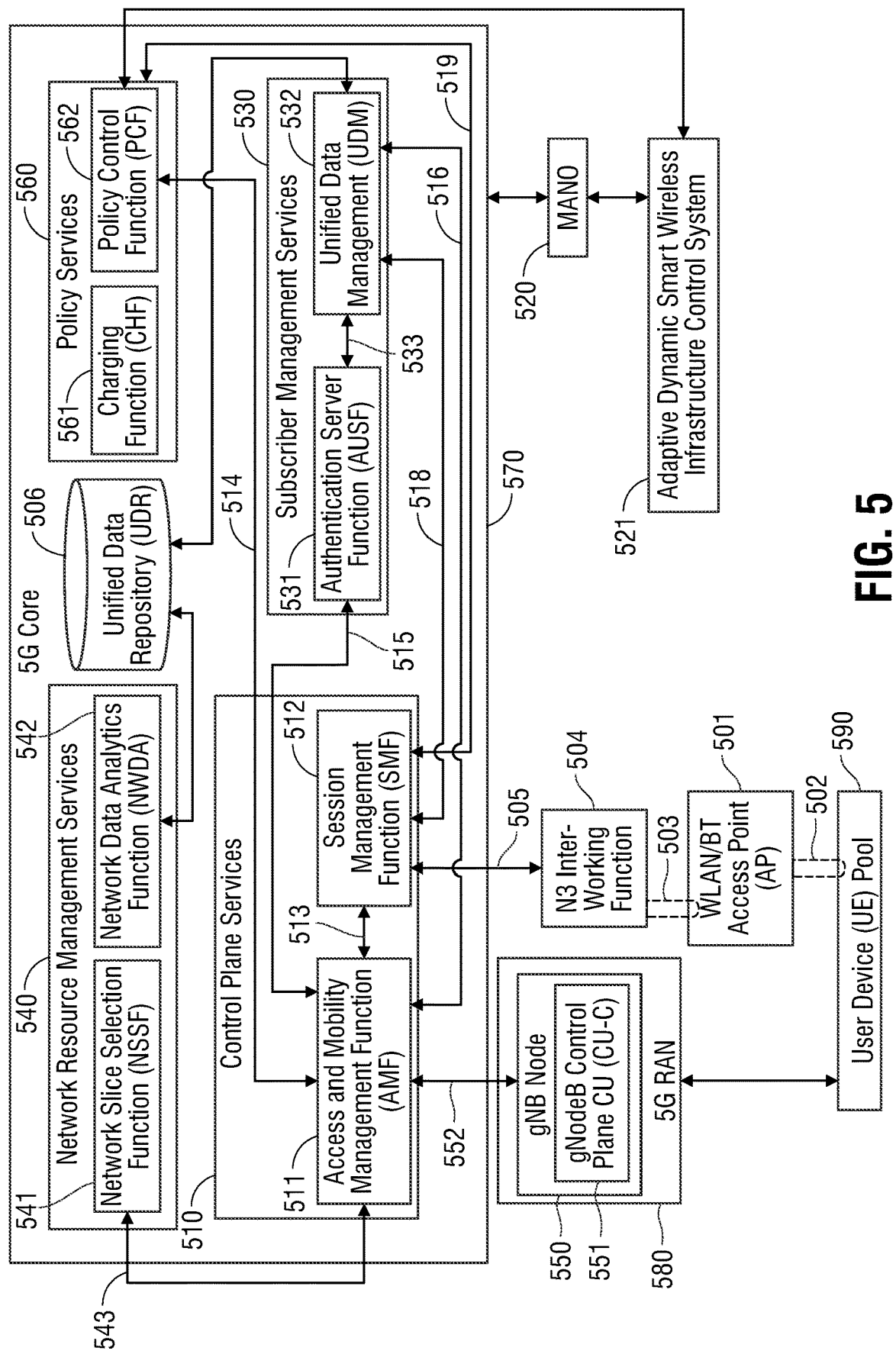
FIG. 5 is a block diagram illustrating 5G network core according to an embodiment of the present disclosure.

FIG. 5 is a block diagram illustrating 5G network core of an enterprise mobile network according to an embodiment of the present disclosure. As described herein, choice of the cellular core through which communications between a UE in the pool 590 and the remote cloud network may be routed may impact overall connectivity metrics of such communications. FIG. 5 describes processing of data packets with a UE pool 590 via a 5G core 570 of the enterprise mobile network. As described herein, the 5G core 570 uses a service-based architecture, in which the 5G core processes data packets received from various RANs (e.g., gNodeB 550 of 5G RAN, or 4G eNodeB 408 in FIG. 4), or non-cellular APs (e.g., 501) by executing a series of network functions (NFs), each operating as a separate containerized software application. These network functions comprise, at least, control plane services 510, subscriber management services 530, network resource management services 540, and policy services 560. It is contemplated other network functions, not illustrated within FIG. 5 may be incorporated within the 5G core 570 described herein. Network functions are in communication with one another via fiber-optic cables or buses having point-to-point reference points defining formatting of transceived messages between two or more network functions. Each of these reference points may be defined within the ETSI technical specifications (e.g., TS 23.501).

Because each of the NFs (e.g., 511, 512, 531, 532, 541, 542, 561, and 562) within control plane services 510, subscriber management services 530, network resource management services 540, and policy services 560 are containerized software applications, the number of each NF executing within the 5G core 570 in an embodiment may be dictated by a preset NF replication rate. The performance of the NFs in an embodiment may further be impacted by a preset processor call priority setting which dictates the priority with which a processor may execute calls from such NFs. In other words, a higher processor call priority setting may result in an NF processing a higher volume of data packets over a certain time period than another NF with a lower processor call priority setting.

Each NF (e.g., 511, 512, 531, 532, 541, 542, 561, and 562) in an embodiment may be associated with various performance requirements. In addition, the 5G core 570 may also be associated with performance requirements. For example, each NF in an embodiment may be associated with a maximum processor utilization rate capping the percentage of processing resources accessible by that NF. As another example, the 5G core 570 may be associated with a guaranteed bit rate (GBR) defining a portion of network and processing resources set aside or reserved for executions of the 5G core 570. If the performance metrics for the 5G core 570 in an embodiment indicate the 5G core 570 is not consuming the network or processing resources set aside according to the GBR, this may indicate an adjustment to the infrastructure component configuration may be needed. In other words, this may indicate a need to adjust the processing resources allocated to the 5G core 570.

The gNodeB 550 of the 5G RAN in an embodiment may exchange data packets with the 5G core 570 in a control plane and in a user plane. For example, control plane data may be transceived between a CU-C 551 of the gNodeB 550 and an Access and Mobility Management Function (AMF) 511 of the 5G core 570 via an N2 backhaul connection 552. User plane data may also be transceived between a CU-U and a User Plane Function (UPF) of the 5G core, as described above with respect to FIG. 4. The user plane and related functions within the 5G core are not the focus of FIG. 5, and are thus not illustrated, although it is contemplated the 5G core described with reference to FIG. 5 comprises such functionality.

The AMF 511 in an embodiment may operate as one of a plurality of control plane services 510 to oversee authentication, connection, and mobility management between the 5G core and each of the UEs in pool 590. Control plane services 510 in an embodiment may provide control of the network, including access, mobility, policy, exposure, legal intercept, and charging related control. The Session Management Function (SMF) may be included within the control plane services 510, which may operate to handle session management, IP address allocation, and control of policy enforcement. The AMF may communicate with the SMF in an embodiment via an N11 reference point connection 513, for example.

The SMF 512 in an embodiment may also facilitate direct communication between a non-cellular AP 501 and the 5G core 570, eliminating the need to route communications to the 5G core 570 through the 5G RAN (e.g., gNodeB 550). For example, one or more UEs in pool 590 may establish an IP Session Tunnel 502 with the non-cellular AP 501, which may, in turn, establish an IP Session Tunnel 503 to an N3 inter-working function 504 of the enterprise mobile network. The N3 inter-working function 504 in an embodiment may transceive IP packets with the UE pool 590 via these IP session tunnels 502 and 503, then transceive data packets with the SMF 512 via an N2 reference point connection 505.

The 5G core 570 may further include subscriber management services 530, including an authentication server function (AUSF) 531 and a Unified Data Management (UDM) function 532. The AUSF 531 in an embodiment may perform authentication with UEs within pool 490, similarly to the HSS of the 4G EPC. The AUSF 531 may be in communication with the AMF 511 via an N12 reference point connection 515, and with the UDM function 532 via an N13 reference point connection 533. The UDM function 532 in an embodiment may control access to a converged repository of subscriber information at the unified data repository (UDR) 506 from a plurality of other NFs in the 5G core 570. The UDM function 532 may be in communication in an embodiment with the SMF 512 via an N10 reference point connection 518, and with the AMF 511 via an N8 reference point connection 516.

The Unified Data Repository (UDR) 506 in an embodiment may store data relating to performance metrics, performance requirements, connectivity metrics, connectivity requirements, infrastructure component configurations, and internetwork connectivity configurations. The UDR 506 may store policy information for the plurality of UEs, similar to that stored by the HSS of the 4G EPC. These policies may inform or dictate the types of wireless communication networks with which each UE associated with a given policy may establish wireless connections, based on link performance requirements, security requirements, types of networks supported by a given UE, or other factors in various embodiments. For example, the UDR 506 may store a separate policy for each of the UEs in the pool 590 that specifies the types of wireless communication networks (e.g., 3G, 4G, 5G, Wi-Fi, Wi-Max, BlueTooth®, Near Field Communications (NFC), etc.) with which the UE associated with that policy may be capable of establishing wireless links. As another example, such a policy may identify whether a given UE supports 5G network slicing capabilities. As yet another example, such a policy may identify a given UE's preference of one type of wireless communication network over another (e.g., preference of cellular over Wi-Fi, preference of 5G over 4G, preference of Wi-Max over Wi-Fi, etc.), or preference of one type of cellular network core over another (e.g., preference of processing wireless signals through the 5G core rather than the 4G core). In yet another example, such a policy may identify one or more policy-based connectivity requirements. More specifically, a UE may be associated with a minimum threshold requirement for signal strength, throughput, latency, or other wireless connectivity performance metrics for established wireless links.

In still another example, such a policy may identify one or more security levels with which a given UE may be associated. Such security levels may be assigned to each UE by an IT professional of the enterprise operating the enterprise mobile network, and may be adjustable or dynamically adaptable based on real-time metrics describing the usage, location, or movement of the UE. For example, use of specific applications may cause the UE to be associated with a higher level of security needed to protect transmission of information pursuant to execution of such programs. As another example, location of the UE on a campus or a specific sub-portion of a campus for the enterprise may cause the UE to be associated with a higher level of security. As yet another example, movement of the UE within the campus may indicate the device is mobile, and thus, less likely to require a higher level of security reserved for stationary desktop devices located within secure areas of the campus. In still other examples, the role of the UE user may dictate the assigned security level, such that employees regularly engaging in transfer of sensitive data (e.g., confidential technical information, confidential legal or accounting information, etc.) may be assigned a higher security rating than an individual not regularly transferring such data.

Network resource management services 540 may further be included within the 5G core 570 in an embodiment, including a network slice selection function (NSSF) 541 and a network data analytics function (NWDA) 542. The NSSF 541 in an embodiment may select a network slice instance defining specific versions or replicas of each network function to be used in concert with one another to process data packets transceived with one or more UEs in pool 590 that are assigned to a specifically identified network slice. The combination of each of these NF versions or replicas may form a network slice in an embodiment, which may then be assigned by the NSSF 541 to one or more of such UEs in the pool 590. The NSSF 541 may also operate in tandem with the AMF 511 via an N22 reference point connection 543 to route traffic to the assigned network slice. The NWDA 542 may access and transmit data stored at the UDR 506 to the MANO 520 in an embodiment, upon request by the MANO 520. As described herein, such stored data, including performance metrics, performance requirements, connectivity metrics, connectivity requirements (e.g., as defined according to UE-based policies), infrastructure component configurations, and internetwork connectivity configurations may be input into a trained neural network of the adaptive dynamic smart wireless infrastructure control system 521 to determine adjustments to infrastructure and connectivity predicted to satisfy performance requirements and connectivity requirements for the pool of UEs 590.

The 5G core 570 may further include policy services 560, including a charging function (CHF) 561 and a policy control function (PCF) 562. The CIF 561 in an embodiment may allow charging services to be offered to authorized network functions, while the PCF 562 provides functionality similar to the policy/charging rules function (PCRF) of the 4G EPC. More specifically, the PCF 562 in an embodiment may govern the network behavior by supporting a unified policy framework and access subscription information for enforcement of policy decisions. The PCF 562 in an embodiment may be in communication with the AMF 511 via an N15 reference point connection 514, and with the SMF 512 via an N7 reference point connection 519. The adaptive dynamic smart wireless infrastructure control system 521 in an embodiment may also be capable of gathering any policies stored at the PCF 562.

As described herein, the enterprise mobile network in an embodiment may be managed by a single entity or enterprise, and may include a plurality of RANs (e.g., 4G RAN, or 5G RAN described with reference to FIGS. 2 and 3 above), cellular network cores (e.g., 4G Evolved Packet Core described with reference to FIG. 3 above, or 5G core 570), and non-cellular access points (e.g., WLAN or BlueTooth® AP 501). Each UE within pool 590 may be capable of establishing a wireless link with a RAN (e.g., 4G RAN described with reference to FIG. 3, or 5G RAN described with reference to FIG. 4 above), or a non-cellular AP (e.g., WLAN or BlueTooth® AP 501) in an embodiment. Wireless connectivity metrics for each wireless link may vary based on the type of RAN or AP with which a UE has established such a link. For example, a wireless link between a UE within pool 590 and 4G RAN may provide greater throughput than a wireless link between that UE and the WLAN/BT AP 501, while the wireless link between that UE and the WLAN/BT AP 501 provides lower latency. This is only one of many possible comparisons between wireless connectivity metrics of wireless links established between a UE within pool 590 and any given RAN or AP in various embodiments. Other connectivity metrics that may be considered for comparison between two wireless links may include, for example, security of the wireless link, signal strength, percentage of dropped packets, or another wireless connectivity metric routinely monitored, recorded, or stored at a UE within pool 590, at the UDR 506, at the MANO 520, or at the adaptive dynamic smart wireless infrastructure control system 521, as described herein. Thus, choice of the RAN or AP through which communications between a UE in the pool 590 and the remote cloud network or MEC resources may be routed may impact overall connectivity metrics of such communications.

Processing performed at any core (e.g., EPC 350 described with reference to FIG. 3, or 5G core 570) may impact overall connectivity metrics between a UE within pool 590 and the remote cloud network or MEC resources. The ways in which each of these connectivity metrics impacts quality of communications between the pool 590 of UEs and the remote cloud network or MEC resources, as routed through various components of the enterprise mobile network may vary over time as the applications executed by these UEs changes, various UEs enter or leave the pool 590 of linked UEs, the capabilities of the UEs within the pool 590 changes (e.g., more 4G capable UEs enter and more 5G capable UEs exit), or the locations of various UEs within the pool 590 changes. The adaptive dynamic smart wireless infrastructure control system 521 in an embodiment addresses these issues by routinely assessing the communication needs for the pool 590 of UEs wirelessly linked to the enterprise mobile network operating a plurality of cellular and non-cellular RANs, APs (e.g., including AP 501), and network cores (e.g., including 5G core 570) and adjusting availability of resources at each of these RANs, APs, and cores to meet UE needs. For example, the adaptive dynamic smart wireless infrastructure control system 521 may determine one or more adjustments that may be made to the distribution of computing resources or antenna systems predicted to satisfy performance requirements and UE connectivity requirements, as described in greater detail with respect to FIGS. 7-9 below.

The MANO 520 may orchestrate availability of computing resources for execution of various services or network functions within 5G core 570, based on such adjustments determined by the adaptive dynamic smart wireless infrastructure control system 521 in an embodiment. The MANO 520 in an embodiment may communicate with the 4G RAN and the 4G EPC (as described in greater detail with respect to FIG. 3), the 5G RAN (e.g., as described with reference to FIG. 4), the 5G core 570, and the WLAN/BlueTooth® AP 501 to gather performance metrics, performance requirements, connectivity metrics, policy-based connectivity requirements, infrastructure component configurations, and internetwork connectivity configurations for each of these systems, and connected UEs within the pool 590. For example, the MANO 520 in an embodiment may gather performance metrics from the 5G core 570 measuring the rates at which each of the NFs (e.g., 511, 512, 531, 532, 541, 542, 561, and 562) are utilizing processing resources. In another example, the MANO 520 may gather infrastructure component configurations for the 5G core 570 describing current replication rates and processor call priorities for each of the NFs (e.g., 511, 512, 531, 532, 541, 542, 561, and 562). In another example, the MANO 320 in an embodiment may gather performance requirements for the 5G core 570, such as guaranteed bit rates (GBRs) defining processing resources reserved for performance of 5G core 570.

Further, each UE in the pool 590 may communicate with the MANO 520 to share gathered connectivity metrics for wireless links established by that UE, or performance metrics describing currently executing software applications at the UE, security requirements for UE wireless communication, power consumption metrics at the UE, processor consumption or other performance metrics at the UE, or UE location data. Connectivity requirements for those UEs may include, for example, a need for wireless links of a minimum throughput value, or a maximum latency value. These minimum throughput values, maximum latency values, or other Quality of Service (QoS) requirements, and security settings for such a UE may also be stored within policies at the UDR 506 or the PCF 562 in an embodiment. In such an embodiment, the adaptive dynamic smart wireless infrastructure control system 521 may retrieve these policies directly from the PCF 562.

The adaptive dynamic smart wireless infrastructure control system 521 in an embodiment may access these gathered performance metrics, performance requirements, connectivity metrics, policy-based connectivity requirements, infrastructure component configurations, and internetwork connectivity configurations from the MANO 520, and output adjusted infrastructure component configurations or adjusted internetwork connectivity configurations predicted to satisfy infrastructure performance guarantees and UE connectivity QoS requirements, as described in greater detail with respect to FIGS. 7-9 below. Adjusted infrastructure component configurations in an embodiment may define adjustments to the distribution of computing resources or antenna systems. Adjusted internetwork connectivity configurations in an embodiment may define adjustments to the distribution of traffic among the UE pool 590, 4G RAN, 5G RAN, non-cellular AP 501, 4G EPC, and 5G core 570. The adaptive dynamic smart wireless infrastructure control system 521 may transmit instructions to the MANO 520 to perform one or more of these determined adjustments in some embodiments.

The adaptive dynamic smart wireless infrastructure control system 521 may transmit instructions to the MANO 520 to perform one or more of these determined adjustments to provide instructions for each adjustment to be made at various components within the enterprise mobile network in some embodiments. In other embodiments, the adaptive dynamic smart wireless infrastructure control system 521 may transmit an instruction to the PCF 562 to adjust policies for one or more UEs in pool 590 stored at the UDR 506. For example, in an embodiment in which the adjusted internetwork connectivity configuration includes an adjustment to traffic load at a specific network switch (e.g., illustrating a potential bottleneck in data packet transmission that may be remedied by adjusting the flow of traffic), the MANO 520 may identify one or more APs (e.g., 501) capable of establishing communication with the 5G core 570 and one or more specifically identified UEs in the pool 590. In such an embodiment, the MANO 520 may initiate or instruct those specifically identified UEs in the pool 590 to terminate their wireless links with the 5G RAN 580 and to establish communication with the 5G core 570 via the AP 501. This may be achieved, at least in part, by the MANO 520 adjusting the policies for each of these specifically identified UEs at the UDR 506 via the PCF 562 to prioritize wireless links with the AP 501 over wireless link with the 5G RAN 580.

The MANO 520 in an embodiment may operate to increase or decrease the computing resources dedicated to operation of various NFs (e.g., 511, 512, 531, 532, 541, 542, 561, and 562) of the 5G core 570 in an embodiment, based on such adjustments determined by the adaptive dynamic smart wireless infrastructure control system 521. For example, the MANO 520 may increase or decrease the replication rate or processor call priority setting for one or more NFs (e.g., 511, 512, 531, 532, 541, 542, 561, and 562) to adjust the computing resources consumed at the 5G core 570.

Figure 6:
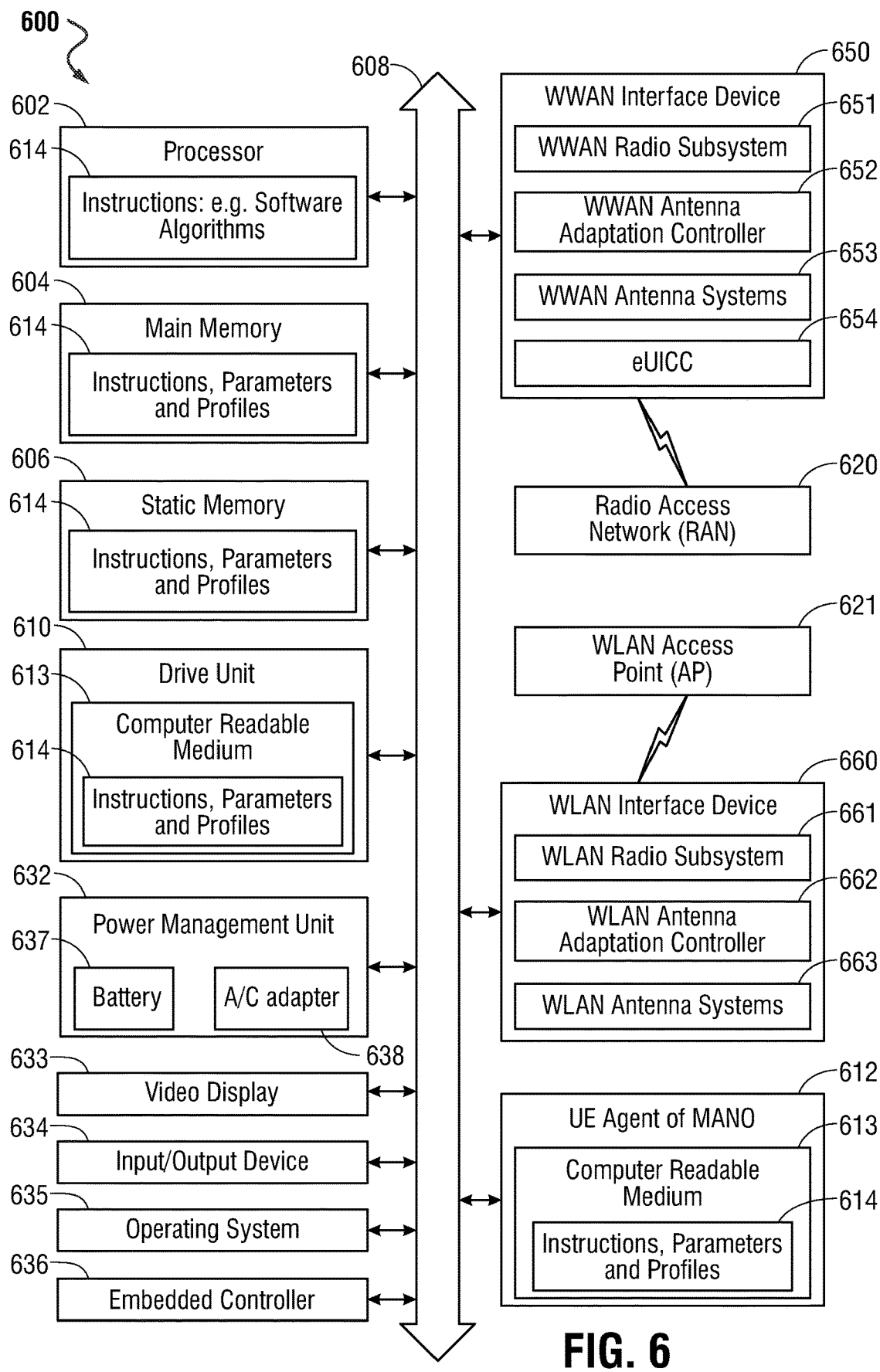
FIG. 6 is a block diagram illustrating an information handling system of a user equipment device (UE) according to an embodiment of the present disclosure.

FIG. 6 is a block diagram illustrating an information handling system of a user equipment device (UE) in wireless communication via a RAN or an AP of an enterprise mobile network according to an embodiment of the present disclosure. As described herein, the Management and Orchestration Module (MANO) in an embodiment may operate as a virtual machine or containerized software application of a computing node within the enterprise mobile network in an embodiment to orchestrate availability of computing resources for execution of various RAN computing nodes and various services or network functions within a 5G core, to optimize communication for a pool of UEs, such as information handling system 600, communicating within the enterprise mobile network. In a networked deployment, the information handling system 600 may operate in the capacity of a server or as a client computer in a server-client network environment, or as a peer computer system in a peer-to-peer (or distributed) network environment. In a particular embodiment, the computer system 600 can be implemented using electronic information handling systems that provide voice, video or data communication. For example, an information handling system 600 may be any mobile or other computing device capable of executing a set of instructions (sequential or otherwise) that specify actions to be taken by that machine. Further, while a single information handling system 600 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 600 can include devices or modules that embody one or more of the devices or execute instructions for the one or more systems and modules described above, and operates to perform one or more of the methods described above. The information handling system 600 may execute code instructions 614 that may operate on servers or systems, remote cloud networks, multi-access edge computing (MEC) systems, or on-box in individual client information handling systems according to various embodiments herein. In some embodiments, it is understood any or all portions of code instructions 614 may operate on a plurality of information handling systems 600.

The information handling system 600 may include a processor 602 such as a central processing unit (CPU), control logic or some combination of the same. Any of the processing resources may operate to execute code that is either firmware or software code. Moreover, the information handling system 600 can include memory such as main memory 604, static memory 606, computer readable medium 613 storing instructions 614 of an antenna selection algorithm, and drive unit 610 (volatile (e.g., random-access memory, etc.), nonvolatile (read-only memory, flash memory etc.) or any combination thereof). The information handling system 600 can also include one or more buses 608 operable to transmit communications between the various hardware components such as any combination of various input and output (I/O) devices.

As shown, the information handling system 600 may further include a video display device 633. The video display device 633 in an embodiment may function as a liquid crystal display (LCD), an organic light emitting diode (OLED), a flat panel display, or a solid-state display. Additionally, the information handling system 600 may include an alpha numeric input device 634, such as a keyboard, and/or a cursor control device, such as a mouse, touchpad, or gesture or touch screen input device. The information handling system 600 can also include a disk drive unit 610.

The Wireless Wide Area Network (WWAN) interface device 650 may provide connectivity of the information handling system 600 to a Radio Access Network (RAN) 620, such as the 4G RAN described above in greater detail with respect to FIG. 3, or the 5G RAN described in greater detail above with respect to FIG. 4, via one or more WWAN wireless links in an embodiment. The RAN 620, in combination with the 4G EPC (e.g., described in greater detail with respect to FIG. 3, above) or the 5G core (e.g., as described in greater detail with respect to FIG. 5, above) may form a WWAN communication network in an embodiment, which may comprise a wired wide area network (WAN), a private LTE communication network, a 4G LTE public communication network, or a 5G millimeter-wave (mm-wave) communication network, or other cellular communication networks. Connectivity of the information handling system 600 of a UE device to any of a plurality of WWAN networks in an embodiment may be via wired or wireless connection. In some aspects of the present disclosure, the WWAN interface device 650 may operate two or more wireless links. In other aspects of the present disclosure, the information handling system 600 may include a plurality of WWAN interface devices, each operating separate radio subsystems.

The WWAN interface device 650 may operate in accordance with any cellular wireless data communication standards. WWAN interface device 650, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the WWAN interface device 650 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) of a 4G RAN (as described in greater detail with respect to FIG. 3) in combination with the 4G EPC, or the 5G network core (as described in greater detail with respect to FIG. 5), or a logical 5G radio node (gNodeB) of the 5G RAN (as described in greater detail with respect to FIG. 4), in combination with the 5G network core.

Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands. WWAN may use the Unlicensed National Information Infrastructure (U-NII) band which typically operates in the −5 GHz frequency band such as 802.11 a/h/j/n/ac (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the WWAN interface device 650 may be communicatively coupled to an array of WWAN antenna systems 653 used to provide a communication channel to one or more of the RANs (e.g., 620). The WWAN antennas 653 may support a 5G wireless communication protocol so that relatively higher amounts of data may be transceived by the information handling system 600 to any WWAN communication network to which the information handling system 600 is communicatively coupled in some embodiments. As described herein, the adaptive dynamic smart wireless infrastructure control system of an enterprise mobile network in an embodiment may work in tandem with the MANO (e.g., as described in greater detail with respect to FIGS. 2-4) to increase or decrease the resources dedicated to operation of antennas for any given cellular or non-cellular protocol. As the resources are increased or decreased at various RANs 620 or APs 621 in such an embodiment, the UE information handling system 100 may be directed to terminate wireless links with scaled-down networks and establish new wireless links with scaled-up networks. The UE agent of the adaptive dynamic smart wireless infrastructure control system 612 may receive such instructions from the adaptive dynamic smart wireless infrastructure control system or MANO of an enterprise mobile network (e.g., as described in greater detail with respect to FIGS. 2-4), via communication with the RAN 620, or the AP 621, for example. The UE agent of the adaptive dynamic smart wireless infrastructure control system 612 in such an embodiment may then instruct the WWAN radio subsystem 651 and the WWAN antenna system 653 to establish the wireless links identified within the received instructions.

The WWAN antenna controller 652 may monitor wireless link state information, wireless link configuration data, network slice data, or other input data to generate channel estimation and determine antenna radiation patterns. For example, the antenna controller 652 in an embodiment may receive, process, or store beacon data from an enterprise mobile network describing channels available for communication with the RAN 620, as well as various current traffic metrics for communications on those channels. More specifically, such beacon information may provide a relative signal strength indicator (RSSI), identification of the communication channels as private or public, identification of the RAN 620 as compatible with multiple user, multiple input, multiple output (MU-MIMO) communications, high available data rate, levels of channel contention, and current load of communications at the RAN 620. Such beacon data may include such measurements or indications for each of the channels within which the RAN 620 is capable of transceiving data, and the beacons may be received in regular intervals.

The WWAN interface device 650 in an embodiment may further include a WWAN radio subsystem 651 which may operate to modulate and demodulate signals transceived within a WWAN format, set signal transmission power levels or sensitivity to signal reception, select channels or frequency bands, and conduct other functions in support of a wireless transmission from the pool of UEs 117 to 4G EPC 150 or the 5G network core 170.

The UE information handling system 600 in an embodiment may also be capable of establishing wireless links within an enterprise mobile network via a non-cellular access point (AP) 621, via a WLAN interface device 660. The non-cellular AP 621 in an embodiment may route communications received from the information handling system 600 to the 4G network core (e.g., as described with reference to FIG. 3), or the 5G network core (e.g., as described with reference to FIG. 5). The non-cellular AP 621 may thus provide a WLAN network that may be a wired local area network (LAN), a wireless personal area network (WPAN), a public WiFi communication network, a private WiFi communication network, a public WiMAX communication network, a Bluetooth® communication network, or any other non-cellular (non-3GPP) communication networks.

In some aspects of the present disclosure, the WLAN network interface device 140 may operate two or more wireless links. In other aspects of the present disclosure, the information handling system 600 may include a plurality of WLAN network interface devices 660, each capable of establishing a separate wireless link to AP 621, such that the information handling system 600 may be in communication with AP 621, via a plurality of wireless links.

The WLAN network interface device 660 may operate in accordance with any cellular wireless data communication standards. To communicate with a wireless local area network, standards including IEEE 802.11 WLAN standards, IEEE 802.15 WPAN standards, WiMAX, Bluetooth®, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the −5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

In an embodiment, the WLAN network interface device 660 may be communicatively coupled to an array of antenna systems 663 used to provide a plurality of separate communication channels. As described herein, the adaptive dynamic smart wireless infrastructure control system of an enterprise mobile network in an embodiment may work in tandem with the MANO (e.g., as described in greater detail with respect to FIGS. 2-4) to increase or decrease the resources dedicated to operation of antennas for any given cellular or non-cellular protocol. As the resources are increased or decreased at various RANs 620 or APs 621 in such an embodiment, the UE information handling system 100 may be directed to terminate wireless links with scaled-down networks and establish new wireless links with scaled-up networks. The UE agent of the adaptive dynamic smart wireless infrastructure control system 612 may receive such instructions from the adaptive dynamic smart wireless infrastructure control system or MANO of an enterprise mobile network (e.g., as described in greater detail with respect to FIGS. 2-4), via communication with the RAN 620, or the AP 621, for example. The UE agent of the adaptive dynamic smart wireless infrastructure control system 612 in such an embodiment may then instruct the WLAN radio subsystem 661 and the WLAN antenna system 663 to establish the wireless links identified within the received instructions.

The WLAN antenna controller 662 may monitor wireless link state information, wireless link configuration data, network slice data, or other input data to generate channel estimation and determine antenna radiation patterns. For example, the WLAN antenna controller 662 in an embodiment may receive, process, or store beacon data from an enterprise mobile network describing channels available for communication with the AP 621, as well as various current traffic metrics for communications on those channels. More specifically, such beacon information may provide a relative signal strength indicator (RSSI), identification of the communication channels as private or public, identification of the AP 621 as compatible with multiple user, multiple input, multiple output (MU-MIMO) communications, high available data rate, levels of channel contention, and current load of communications at the AP 621. Such beacon data may include such measurements or indications for each of the channels within which the AP 621 is capable of transceiving data, and the beacons may be received in regular intervals.

The WLAN network interface device 660 in an embodiment may further include a radio subsystem 661 which may operate to modulate and demodulate signals transceived within a WLAN format, set signal transmission power levels or sensitivity to signal reception, select channels or frequency bands, and conduct other functions in support of a wireless transmission to the RAN 620 or the AP 621 of the enterprise mobile network.

The information handling system 600 may further include a power management unit (PMU) 632 (a.k.a. a power supply unit (PSU)). The PMU 632 may manage the power provided to the components of the information handling system 600 such as the processor 602, a cooling system, one or more drive units 610, a graphical processing unit (GPU), a video/graphic display device or other input/output devices 634, and other components that may require power when a power button has been actuated by a user. In an embodiment, the PMU 632 may monitor power levels and be electrically coupled to the information handling system 600 to provide this power and coupled to bus 608 to provide or receive data or instructions. The PMU 632 may regulate power from a power source such as a battery 637 or A/C power adapter 638. In an embodiment, the battery 637 may be charged via the A/C power adapter 638 and provide power to the components of the information handling system 600 when A/C power from the A/C power adapter 638 is removed.

Information handling system 600 includes one or more of an operating system (OS) 635, and basic input/output system (BIOS) firmware/software or application programs that may be executable instructions 614 executed at any processor 602 and stored at one or more memory devices 604, 606, or 610. BIOS firmware/software functions to initialize information handling system 600 on power up, to launch an OS 635, and to manage input and output interactions between the OS 635 and the other elements of information handling system 600. In a particular embodiment, BIOS firmware/software resides in memory 604, and include machine-executable code that is executed by processor 602 to perform various functions of information handling system 600 as described herein. In another embodiment (not illustrated), application programs and BIOS firmware/software reside in another storage medium of information handling system 600. For example, application programs and BIOS firmware/software can reside in drive 610, in a ROM (not illustrated) associated with information handling system 600, in an option-ROM (not illustrated) associated with various devices of information handling system 600, in a storage system (not illustrated) associated with network channel of a WWAN interface device 650 or a WLAN interface device 660, in another storage medium of information handling system 600, or a combination thereof. Executable code instructions 614 for application programs and BIOS firmware/software can each be implemented as single programs, or as separate programs carrying out the various features as described herein.

As shown in FIG. 6, the information handling system 600 may further include an embedded subscriber identification module (eSIM) 654. The eSIM 654 may include an integrated circuit card identification number (ICCID) for the information handling system 600, an international mobile subscriber identity (IMSI) number for the information handling system 600, security authentication and ciphering information for the information handling system 600, temporary information related to a local network associated with the information handling system 600, a list of the services that the information handling system 600 has access to, and two passwords: a personal identification number (PIN) for ordinary use, and a personal unblocking key (PUK) for PIN unlocking.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller such as embedded controller (EC) 636 or a processor 602 system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 614 or receives and executes instructions, parameters, and profiles 614 responsive to a propagated signal; so that a device connected to a network via RAN 620 or AP 621, for example, can communicate voice, video or data over the wireless network. Further, the instructions 614 may be transmitted or received over the wireless network via the network interface device (e.g., 650 or 660).

The information handling system 600 can include a set of instructions 614 that can be executed to cause the computer system to perform any one or more of the methods or computer-based functions disclosed herein. For example, instructions 614 may execute an antenna selection algorithm, various software applications, software agents, or other aspects or components. Various software modules comprising application instructions 614 may be coordinated by an operating system (OS), and/or via an application programming interface (API). An example operating system may include Windows®, Android®, and other OS types known in the art. Example APIs may include Win 32, Core Java API, or Android APIs.

The disk drive unit 610 and may include a computer-readable medium 613 in which one or more sets of instructions 614 such as software can be embedded to be executed by the processor 602 to perform the processes described herein. Similarly, main memory 604 and static memory 606 may also contain a computer-readable medium for storage of one or more sets of instructions, parameters, or profiles 614. The disk drive unit 610 or static memory 606 also contain space for data storage. Further, the instructions 614 may embody one or more of the methods or logic as described herein. In a particular embodiment, the instructions, parameters, and profiles 614 may reside completely, or at least partially, within the main memory 604, the static memory 606, and/or within the disk drive 610 during execution by the processor 602 of information handling system 600. The main memory 604 and the processor 602 also may include computer-readable media.

Main memory 604 or other memory of the embodiments described herein may contain computer-readable medium (not shown), such as RAM in an example embodiment. An example of main memory 604 includes random access memory (RAM) such as static RAM (SRAM), dynamic RAM (DRAM), non-volatile RAM (NV-RAM), or the like, read only memory (ROM), another type of memory, or a combination thereof. Static memory 606 may contain computer-readable medium (not shown), such as NOR or NAND flash memory in some example embodiments. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

FIG. 7 is a flow diagram illustrating a method of gathering performance metrics and requirements, connectivity metrics and requirements, infrastructure component configurations, and internetwork connectivity configurations for input into a trained neural network according to an embodiment of the present disclosure. An enterprise-controlled MANO may access a plurality of metrics with operative coupling to both a pool of enterprise-managed UEs as well as one or more components of an enterprise mobile network as described in embodiments herein. As described herein, the ways in which various connectivity metrics and performance metrics impact quality of communications between a pool of UEs and a remote cloud network or MEC resources, as routed through various components of the enterprise mobile network, may vary over time as the applications executed by these UEs changes, various UEs enter or leave the pool of linked UEs, the capabilities of the UEs within the pool changes (e.g., more 4G capable UEs enter and more 5G capable UEs exit), or the locations of various UEs within the pool changes. The adaptive dynamic smart wireless infrastructure control system in an embodiment addresses these issues by routinely assessing the communication needs for the pool of UEs wirelessly linked within the enterprise mobile network, and employing a trained neural network to determine one or more adjustments that may be made to the distribution of computing resources or antenna systems predicted to satisfy performance requirements and UE connectivity requirements.

At block 702, the MANO in an embodiment may gather current and guaranteed performance metrics for non-cellular APs (e.g., WLAN APs) and cellular RANs and cores describing current and guaranteed bitrates, number of network slices, number of active bearers and wireless links, CPU utilization rates, and antenna and switch loads. For example, in an embodiment described with reference to FIG. 2, the MANO 236 may gather from each of these enterprise mobile network infrastructure components (e.g., the 4G RAN 231, the 5G RAN 232, the Wi-Fi AP 233, the 4G EPC 234, and the 5G network core 235) performance metrics and requirements describing, for example, guaranteed bitrates, number of network slices available, number of active bearers and wireless links established with the pool of UEs 210, processor utilization rates, and antenna and switch loads.

As another example, in an embodiment described with reference to FIG. 3, the MANO 320 may gather performance metrics from the 4G RAN 360 measuring current uplink loads at each RRU (e.g., 363, 367, or 372), rates at which each of the BBUs (e.g., 365, 369, or 374) are utilizing processing resources, and traffic loads at each of the BBUs. As another example, the MANO 320 in an embodiment may gather performance metrics from the 4G EPC 350 measuring traffic loads at the S-GW 303 and the P-GW 305, and the rates at which each of the S-GWs (e.g., 303) and P-GWs (e.g., 305) are utilizing processing resources. The MANO 320 may also gather performance requirements, such as guaranteed bit rates (GBRs) defining processing resources reserved for performance of the eNodeB (e.g., 361 or 370), 4G RAN 360 or the 4G EPC 350.

As yet another example, the MANO 474 in an embodiment described with reference to FIG. 4 may gather performance metrics from the 5G RAN 480 measuring current uplink loads at each RU (e.g., 403 and 406), rates at which each of the DUs (e.g., 410 and 412) and CUs (e.g., 431 and 433) are utilizing processing resources, and traffic loads at each of the CUs. The MANO 474 in such an example embodiment may also gather performance requirements for the gNodeB 450, 5G RAN 480 or the 5G core 470, such as guaranteed bit rates (GBRs) defining processing resources reserved for performance of the gNodeB 450, 5G RAN 480, or 5G core 470.

In still another example, the MANO 520 in an embodiment described with reference to FIG. 5 may gather performance metrics from the 5G core 570 measuring the rates at which each of the NFs (e.g., 511, 512, 531, 532, 541, 542, 561, and 562) are utilizing processing resources. The MANO 520 in such an example embodiment may further gather performance requirements for the 5G core 570, such as guaranteed bit rates (GBRs) defining processing resources reserved for performance of 5G core 570.

The MANO in an embodiment may gather UE performance metrics describing current QoS requirements based on executing software applications, and current and historical battery usage at block 704. For example, in an embodiment described with reference to FIG. 3, each UE in the pool 340 may communicate with the MANO 320 to share gathered connectivity metrics for wireless links established by that UE, or performance metrics describing currently executing software applications at the UE, security requirements for UE wireless communication, power consumption metrics at the UE, processor consumption or other performance metrics at the UE, connectivity requirements, or UE location data. UE location data may include information identifying one or more antennas (e.g., 362, 366, or 371) that are within range of the UE, as well as GPS or other geographical location information. Connectivity requirements for those UEs, including a need for wireless links of a minimum throughput value, or a maximum latency value.

At block 706, the MANO in an embodiment may gather UE connectivity metrics describing QoS for all available wireless links. For example, in an embodiment described with reference to FIG. 1, the antenna controller 142 in an embodiment may generate beacon data for transmission to one or more of the pool of UEs 117 describing channels available for communication with that AP 190, as well as various current traffic metrics for communications on those channels. More specifically, such beacon information may provide a relative signal strength indicator (RSSI), identification of the communication channels as private or public, identification of the AP 190 as compatible with multiple user, multiple input, multiple output (MU-MIMO) communications, high available data rate, levels of channel contention, and current load of communications at the AP 190. Such beacon data may include such measurements or indications for each of the channels within which the AP 190 is capable of transceiving data, and the beacons may be received in regular intervals.

In another example embodiment described with reference to FIG. 6, the UE WWAN antenna controller 652 may receive, process, or store beacon data from an enterprise mobile network via WWAN radio 651 describing channels available for communication with the RAN 620, as well as various current traffic metrics for communications on those channels. More specifically, such beacon information may provide a relative signal strength indicator (RSSI), identification of the communication channels as private or public, identification of the RAN 620 as compatible with multiple user, multiple input, multiple output (MU-MIMO) communications, high available data rate, levels of channel contention, and current load of communications at the RAN 620. Such beacon data may include such measurements or indications for each of the channels within which the RAN 620 is capable of transceiving data, and the beacons may be received in regular intervals.

In still another example, the WLAN antenna controller 662 in an embodiment may receive, process, or store beacon data from AP 621, via WLAN radio 661, describing channels available for communication with the AP 621, as well as various current traffic metrics for communications on those channels. More specifically, such beacon information may provide a relative signal strength indicator (RSSI), identification of the communication channels as private or public, identification of the AP 621 as compatible with multiple user, multiple input, multiple output (MU-MIMO) communications, high available data rate, levels of channel contention, and current load of communications at the AP 621. Such beacon data may include such measurements or indications for each of the channels within which the AP 621 is capable of transceiving data, and the beacons may be received in regular intervals.

The MANO in an embodiment may gather UE policies describing minimum QoS requirements and security requirements at block 708. For example, the minimum throughput values, maximum latency values, or other Quality of Service (QoS) requirements described at block 704 above, and security settings for such a UE, may also be stored within policies at the HSS 312. In such an embodiment, the adaptive dynamic smart wireless infrastructure control system 321 may retrieve these policies directly from the PCRF 307. In an embodiment described with reference to FIG. 5, these minimum throughput values, maximum latency values, or other Quality of Service (QoS) requirements, and security settings for such a UE may also be stored within policies at the UDR 506 or the PCF 562. In such an embodiment, the adaptive dynamic smart wireless infrastructure control system 521 may retrieve these policies directly from the PCF 562.

At block 710, the MANO in an embodiment may gather infrastructure component configurations describing distribution of computing resources across the various RANs, APs, MECs, and cores of the enterprise mobile network. For example, in an embodiment described with reference to FIG. 2, the MANO 236 may gather infrastructure component configurations from the MEC 238, including current and total processor and memory availability, and distribution of processing and memory resources of the MEC 238 made available to each of the 4G RAN 231, the 5G RAN 232, the Wi-Fi AP 233, the 4G EPC 234, and the 5G network core 235.

As another example, in an embodiment described with reference to FIG. 3, the MANO 320 may gather infrastructure component configurations for the 4G RAN 360 describing the number of currently active antennas (e.g., 362, 366, and 371) within the 4G RAN 360, and current replication rate and processor call priority for each of the BBUs (e.g., 365, 369, and 374) in the 4G RAN 360. The MANO 320 in such an example embodiment may also gather infrastructure component configurations for the 4G EPC 350 describing current replication rates and processor call priorities for each of the S-GWs (e.g., 303) and P-GWs (e.g., 305).

As another example, the MANO 474 in an embodiment described with reference to FIG. 4 may gather infrastructure component configurations for the 5G RAN 480 describing the number of currently active antennas (e.g., 401, 402, and 405) within the 5G RAN 480, and current replication rate and processor call priority for each of the DUs (e.g., 410 and 412) and CUs (e.g., 431 and 433). In still another example embodiment described with reference to FIG. 5, the MANO 520 may gather infrastructure component configurations for the 5G core 570 describing current replication rates and processor call priorities for each of the NFs (e.g., 511, 512, 531, 532, 541, 542, 561, and 562).

The MANO in an embodiment may gather internetwork connectivity configurations describing distribution of communication traffic across the RANs, APs, and cores of the enterprise mobile network at block 712. For example, in an embodiment described with reference to FIG. 3, the MANO 320 may gather internetwork connectivity configurations defining the network load on a switch (e.g., BBUs 365, 369, or 374) connecting the 5G gNodeB 390 of the 5G RAN to the eNodeB 361 of the 4G RAN 360, the load on a switch (e.g., S-GW 303) connecting the 4G RAN 360 to the 4G EPC 350, and the load on a switch (e.g., P-GW 305) connecting the 4G EPC 350 to a remote cloud network 380. As another example described with reference to FIG. 4, the MANO 474 in an embodiment may gather internetwork connectivity configurations defining the network load on a switch (e.g., DU 412) connecting the 4G eNodeB 408 of the 4G RAN to the DU 412 of the 5G RAN 480, the load on a switch (e.g., CU-C 433) connecting the 5G RAN 480 to the control plane (e.g., AMF 471) of the 5G core 470, and the load on a switch (e.g., CU-U 431) connecting the 5G RAN 480 to the user plane (e.g., UPF 472) of the 5G core 470. Traffic loads at these specific switches may illustrate not only performance of the switch itself, but also any potential bottlenecks in data packet transmission that may be remedied by adjusting the flow of traffic through these various systems.

The performance metrics, performance requirements, connectivity metrics, connectivity requirements, infrastructure component configurations and internetwork connectivity configurations gathered in such a way may form the input layer of a trained neural network in an embodiment. The method for gathering such information may then end.

FIG. 8 is a flow diagram illustrating a method of determining adjusted infrastructure component configurations or adjusted internetwork connectivity configurations predicted to satisfy performance requirements and connectivity requirements according to an embodiment of the present disclosure. As described herein, the adaptive dynamic smart wireless infrastructure control system in an embodiment may assess the communication needs for a pool of UEs wirelessly linked within the enterprise mobile network operating a plurality of cellular and non-cellular RANs, APs, and network cores, and adjust various infrastructure resources at the enterprise mobile network to meet these needs.

At block 802, the adaptive dynamic smart wireless infrastructure control system in an embodiment may generate a multi-layer feedforward neural network having an input layer with nodes for gathered performance metrics, performance requirements, connectivity metrics, connectivity requirements, infrastructure component configurations, and internetwork connectivity configurations. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer. These input values may be gathered in accordance with the method described with reference to FIG. 7, above.

The adaptive dynamic smart wireless infrastructure control system in an embodiment may model the neural network with an output layer including a first group of output nodes comparing performance metrics with performance requirements at block 804. For example, the output layer for an embodiment described with reference to FIG. 3 may include a first group of output nodes that subtracts the performance metrics measuring rates at which each of the BBUs (e.g., 365, 369, or 374) are utilizing processing resources, from the performance requirement of guaranteed bit rates (GBRs) defining processing resources reserved for performance of the eNodeB (e.g., 361 or 370) or the 4G RAN 360. In another example, the output layer may include a first group of output nodes that subtracts the performance metrics measuring rates at which each of the S-GWs (e.g., 303) and P-GWs (e.g., 305) are utilizing processing resources from the performance requirements of guaranteed bit rates (GBRs) defining processing resources reserved for performance of the 4G EPC 350. By subtracting or comparing these values in such a way, the adaptive dynamic smart wireless infrastructure control system may gauge to what extent the various infrastructure components (e.g., BBUs, S-GWs, and P-GWs) of the 4G RAN 360 and 4G EPC 350 are actually using the computing resources reserved for their execution according to the GBRs.

As another example, the output layer for an embodiment described with reference to FIG. 4 may include a first group of output nodes that subtracts the performance metrics measuring rates at which each of the DUs (e.g., 410 and 412) and CUs (431 and 433) are utilizing processing resources, from the performance requirement of GBRs defining processing resources reserved for performance of the gNodeB (e.g., 450) or the 5G RAN 480. In yet another example embodiment described with reference to FIG. 5, the output layer may include a first group of output nodes that subtracts the performance metrics measuring rates at which each of the NFs (e.g., 511, 512, 531, 532, 541, 542, 561, and 562) are utilizing processing resources from the performance requirements of GBRs defining processing resources reserved for performance of 5G core 570. By subtracting or comparing these values in such a way, the adaptive dynamic smart wireless infrastructure control system may gauge to what extent the various infrastructure components (e.g., DUs, CUs, and NFs) of the 5G RAN 480 and 5G core 570 are actually using the computing resources reserved for their execution according to the GBRs.

At block 806, the adaptive dynamic smart wireless infrastructure control system in an embodiment may the output layer of the neural network to include a second group of output nodes comparing UE connectivity metrics with Quality of Service (QoS) requirements. For example, in an embodiment described with reference to block 706 of FIG. 7, the gathered connectivity metrics may include the relative signal strength indicator (RSSI) for established wireless links, identification of the communication channels as private or public, identification of the wireless links as compatible with MU-MIMO communications, and levels of channel contention with the wireless link, at the AP or RAN with which the UE has established such a wireless link. The identification of the communication channel for the wireless link as private or public and identification of the wireless link as compatible with MU-MIMO communications in such an embodiment may be input into the neural network as a binary designation of either 0 or 1 for example. In such an embodiment, the second group of output nodes of the neural network may subtract the gathered connectivity metrics described directly above with minimum RSSI values, security requirements, MU-MIMO requirements, and channel contention level requirements set out within the policies associated with the UEs that have established such wireless links. In such a way, the adaptive dynamic smart wireless infrastructure control system may determine whether each of the UE-specific connectivity requirements have been met by the wireless links for which the connectivity metrics were gathered.

The adaptive dynamic smart wireless infrastructure control system in an embodiment may model the output layer of the neural network to include a third group of output nodes describing adjusted infrastructure component configurations at block 808. These adjusted infrastructure component configuration in an embodiment may include, for example, adjusted numbers of active antennas, adjust replication rates for various infrastructure containerized software applications, or adjusted processor call priorities for various infrastructure containerized software applications. For example, in an embodiment described with reference to FIG. 3, this third group of nodes in the output layer may provide an adjusted number of currently active antennas (e.g., 362, 366, and 371) within the 4G RAN 360, and adjusted replication rates and adjusted processor call priorities for each of the BBUs (e.g., 365, 369, and 374) in the 4G RAN 360. As another example, this third group of nodes in the output layer may provide an adjusted replication rates and adjusted processor call priorities for each of the S-GWs (e.g., 303) and P-GWs (e.g., 305).

In yet another example embodiment described with reference to FIG. 4, this third group of nodes in the output layer may provide an adjusted number of currently active antennas (e.g., 401, 402, and 405) within the 5G RAN 480, and an adjusted replication rate and adjusted processor call priority for each of the DUs (e.g., 410 and 412) and CUs (e.g., 431 and 433). In still another example embodiment described with reference to FIG. 5, this third group of nodes in the output layer may provide an adjusted replication rates and adjusted processor call priorities for each of the NFs (e.g., 511, 512, 531, 532, 541, 542, 561, and 562).

At block 810, the adaptive dynamic smart wireless infrastructure control system may model the output layer of the neural network to include a fourth group of output nodes describing adjusted internetwork connectivity configuration values. These adjusted internetworking connectivity configuration values in an embodiment may include for example, adjusted network loads on switches connecting specifically identified infrastructure components of the various RANs, APs, and cellular network cores of the enterprise mobile network. For example, this fourth group of output nodes in an embodiment described with reference to FIG. 3 may include adjusted internetworking connectivity configuration defining an adjusted network load on a switch (e.g., BBUs 365, 369, or 374) connecting the 5G gNodeB 390 of the 5G RAN to the eNodeB 361 of the 4G RAN 360, an adjusted load on a switch (e.g., S-GW 303) connecting the 4G RAN 360 to the 4G EPC 350, or an adjusted load on a switch (e.g., P-GW 305) connecting the 4G EPC 350 to a remote cloud network 380 or MEC resources. As another example described with reference to FIG. 4, this fourth group of output nodes may include adjusted internetworking connectivity configuration defining an adjusted network load on a switch (e.g., DU 412) connecting the 4G eNodeB 408 of the 4G RAN to the DU 412 of the 5G RAN 480, an adjusted load on a switch (e.g., CU-C 433) connecting the 5G RAN 480 to the control plane (e.g., AMF 471) of the 5G core 470, or an adjusted load on a switch (e.g., CU-U 431) connecting the 5G RAN 480 to the user plane (e.g., UPF 472) of the 5G core 470. Traffic loads at these specific switches may illustrate not only performance of the switch itself, but also any potential bottlenecks in data packet transmission that may be remedied by adjusting the flow of traffic through these various systems. Thus, adjustments to these loads may indicate a need to reroute or redistribute such traffic among the various APs, RANs, and cellular network cores of the enterprise mobile network.

The adaptive dynamic smart wireless infrastructure control system in an embodiment may forward propagate and back propagate the input data (e.g., as gathered pursuant to the method described with reference to FIG. 7 above) through the modeled neural network at block 812 to tune the weight matrices of the neural network. The adaptive dynamic smart wireless infrastructure control system in an embodiment may operate, in part, to model the relationships between the input performance metrics, performance requirements, connectivity metrics, connectivity requirements, infrastructure component configurations, and internetwork connectivity configurations in order to predict infrastructure component configurations or internetwork connectivity configurations most likely to ensure performance metrics meet performance requirements, and connectivity metrics meet connectivity requirements for each of the UEs within the pool transceiving data through the enterprise mobile network. As such, the adaptive dynamic smart wireless infrastructure control system in an embodiment may perform an initial feed-forward of the input node values to generate an initial output layer that includes the first group of output nodes and second group of output nodes described above. In other words, the output layer includes a first determination as to what extent the various infrastructure components are actually using the computing resources reserved for their execution according to the GBRs, and a second determination of whether each of the UE-specific connectivity requirements have been met by the wireless links for which the connectivity metrics were gathered. In order to train the neural network to output adjusted infrastructure component configurations and adjusted internetwork connectivity configurations that will ensure the performance requirements (e.g., GBRs) and connectivity requirements are met, the neural network may be trained to minimize these first and second determinations of the output layer.

The neural network may be trained to minimize these first and second determinations of the output layer by labeling the values in each of the nodes within the first and second groups of output nodes with an error function. Any value above zero at any of these nodes indicates a failure to some degree to satisfy a performance requirement or a connectivity requirement. Thus, any value other than zero at any of these nodes represents an error in accurately predicting values for the remaining output nodes (e.g., the third group of output nodes describing adjusted infrastructure component configurations and the fourth group of output nodes describing adjusted internetwork connectivity configurations) that will satisfy the performance requirements and the connectivity requirements. By back-propagating these error functions through the layers of the neural network and adjusting the weight matrices of each of the layers based on these error functions, the weight matrices may be tuned to more accurately model the relationships between the input node values (e.g., gathered metrics, requirements, and configurations) and adjustments to configurations.

At block 814, the adaptive dynamic smart wireless infrastructure control system in an embodiment may repeat the forward and back propagation on a plurality of gathered datasets until the neural network is fully trained. The adaptive dynamic smart wireless infrastructure control system in an embodiment may repeatedly forward propagate and back propagate the error function for a given set of input nodes until it reaches a preset threshold tolerance (e.g., 0.01), resulting in a neural network with weight matrices that have been tuned to account for this set of input values. The adaptive dynamic smart wireless infrastructure control system may then further tune the weight matrices for the neural network by performing this same repeated forward and back-propagation for a plurality of other input values. As described herein, these performance metrics, performance requirements, connectivity metrics, connectivity requirements, infrastructure component configurations, and internetwork connectivity configurations may be gathered routinely, with each dataset formed therefrom having been gathered during the same time period. The adaptive dynamic smart wireless infrastructure control system in an embodiment may, in such a way, train the neural network to accurately predict adjusted infrastructure component configurations and adjusted internetwork connectivity configurations that may satisfy any input values for performance and connectivity requirements.

The adaptive dynamic smart wireless infrastructure control system in an embodiment may feed updated or current input values into the neural network at block 816. The adaptive dynamic smart wireless infrastructure control system may then output adjusted infrastructure component configurations or internetwork connectivity configurations predicted to satisfy current performance requirements of the various RANs and cores of the enterprise mobile network and to satisfy connectivity requirements for the plurality of UEs currently in communication with the enterprise mobile network. The method for generating adjusted infrastructure component configurations or adjusted internetwork connectivity configurations may then end.

FIG. 9 is a flow diagram illustrating a method of adjusting computing and transceiving resources dedicated to execution of an enterprise mobile network to meet demand from a pool of UE devices for wireless communication links according to an embodiment of the present disclosure. As described herein, the adaptive dynamic smart wireless infrastructure control system in an embodiment may access gathered performance metrics, performance requirements, connectivity metrics, policy-based connectivity requirements, infrastructure component configurations, and internetwork connectivity configurations from multiple enterprise mobile network infrastructure components (e.g., 4G RAN, 5G RAN, 4G EPC, 5G core, MEC resources), networks, and enterprise-managed UEs, as gathered by the MANO, and output adjusted infrastructure component configurations or adjusted internetwork connectivity configurations predicted to satisfy infrastructure performance guarantees and UE connectivity QoS requirements for the pool of enterprise-managed UEs.

At block 902, the MANO of the enterprise mobile network may receive an adjusted infrastructure component configuration or adjusted internetwork connectivity configuration as determined by the adaptive dynamic smart wireless infrastructure and control system. For example, the adaptive dynamic smart wireless infrastructure control system may transmit instructions to the MANO to perform one or more of these adjustments, as outputs from a neural network, as described in greater detail above with respect to embodiments of FIG. 8.

The MANO at block 904 in an embodiment may determine whether adjusted infrastructure component configurations have been received. Adjusted infrastructure component configurations in an embodiment may define adjustments to the distribution of computing resources or antenna systems.

If the MANO has received adjusted infrastructure component configurations, the method may proceed to block 906 for execution of such adjustments at specifically identified infrastructure components of the 4G RAN, 5G RAN, 4G EPC, or 5G core. If the MANO has not received adjusted infrastructure component configurations, the method may proceed to block 908 to determine whether the MANO has received adjusted internetwork connectivity configurations defining adjustments to the distribution of traffic among the UE pool, within the 4G RAN, 5G RAN, non-cellular AP, 4G EPC, and 5G core.

At block 906, the MANO or RIC may adjust replication rates or processor call priorities for various infrastructure components of the 4G RAN, 5G RAN, 4G EPC, or 5G core according to the received adjusted infrastructure component configuration. For example, in an embodiment described with respect to FIG. 2, the number, power, maximum capacity or load for various processors of the MEC 238 may be scaled up or down in order to increase or decrease processing resources made available across the entirety of the enterprise RAN and core infrastructure module 230 in some embodiments. The processing resources made available to a specific infrastructure component (e.g., 4G EPC 234 or 5G core 235) of the enterprise RAN and core infrastructure module 230 may be scaled up or down, based on infrastructure adjustments determined by the adaptive dynamic smart wireless infrastructure control system 237 and implemented by the MANO 236 in another aspect of an embodiment. Similarly, the memory capacity and accessibility of the MEC 238 may be scaled up or down in order to support increased or decreased containerized software application replication rates across the entirety of the enterprise RAN and core infrastructure module 230 in an embodiment. In another aspect of an embodiment, the memory resources made available to a specific infrastructure component (e.g., 4G RAN 231 or 5G RAN 232) of the enterprise RAN and core infrastructure module 230 may be scaled up or down, based on infrastructure adjustments determined by the adaptive dynamic smart wireless infrastructure control system 237 and implemented by the MANO 236.

The MANO 236 in an embodiment may increase or scale up the capabilities of any of the enterprise mobile network infrastructure components (e.g., 4G RAN 231, 5G RAN 232, Wi-Fi AP 233, 4G EPC 234, and 5G core 235) by deploying more clusters, pods, or nodes dedicated to execution of containerized software applications for those components. Such a deployment of additional clusters, pods, or nodes may be achieved by increasing a replication rate for such containerized software applications. Similarly, the MANO 236 in an embodiment may decrease or scale down the capabilities of any of the enterprise mobile network infrastructure components (e.g., 4G RAN 231, 5G RAN 232, Wi-Fi AP 233, 4G EPC 234, and 5G core 235) by removing, repurposing, or taking offline clusters, pods, or nodes dedicated to execution of containerized software applications for those components. Such a removal, repurposing, or taking offline of clusters, pods, or nodes may be achieved by decreasing a replication rate for such containerized software applications.

The MANO 236 in an embodiment may further scale the various enterprise mobile network infrastructure components (e.g., 4G RAN 231, 5G RAN 232, Wi-Fi AP 233, 4G EPC 234, and 5G core 235) by restricting MEC 238 computing resources made available to each of these components. For example, the MANO 236 may increase the ability of an enterprise mobile network infrastructure component (e.g., 4G RAN 231, 5G RAN 232, Wi-Fi AP 233, 4G EPC 234, and 5G core 235) to process a given volume of data packets over a preset time period (e.g., throughput of the component) by increasing the number of processor calls that infrastructure component (e.g., 4G RAN 231, 5G RAN 232, Wi-Fi AP 233, 4G EPC 234, and 5G core 235) may make to the processor within the MEC 238 assigned to handle calls from that infrastructure component.

As another example, in an embodiment described with reference to FIG. 3, MANO 320 may increase or decrease the number of active antennas (e.g., 362, 366, or 371) to adjust the uplink load across the plurality of active RRUs (e.g., 363, 367, or 372). As another example, the MANO 320 may increase or decrease the replication rate or processor call priority setting for one or more BBUs (e.g., 365, 369, or 374) to adjust the network switch traffic load across the plurality of active BBUs (e.g., 365, 369, or 374). As yet another example, the MANO 320 may increase or decrease the replication rate or processor call priority setting for one or more S-GWs (e.g., 303) to adjust the network switch traffic load between the 4G RAN 360 and the 4G EPC 350. As still another example, the MANO 320 may increase or decrease the replication rate or processor call priority setting for one or more P-GWs (e.g., 305) to adjust the network switch traffic load between the 4G EPC 350 and a remote cloud network 380 or MEC resources.

In another example embodiment described with reference to FIG. 4, the MANO 474 or RIC 441 may increase or decrease the replication rate or processor call priority setting for one or more DUs (e.g., 410 or 412) to adjust the network switch traffic load across the plurality of active DUs (e.g., 410 or 412). As yet another example, the MANO 474 or RIC 441 may increase or decrease the replication rate or processor call priority setting for one or more CUs (e.g., 431 or 433) to adjust the network switch traffic load between the 5G RAN 480 and the 5G core 470. As still another example, the MANO 474 or RIC 441 may increase or decrease the replication rate or processor call priority setting for one or more User Plane Functions (UPFs) 472 to adjust the network switch traffic load between the 5G core 470 and a remote cloud network 473 or MEC resources.

In still another example embodiment described with reference to FIG. 5, the MANO 520 may increase or decrease the replication rate or processor call priority setting for one or more NFs (e.g., 511, 512, 531, 532, 541, 542, 561, and 562) to adjust the computing resources consumed at the 5G core 570. The method may the proceed to block 908 to determine whether the MANO has received adjusted internetwork connectivity configurations defining adjustments to the distribution of traffic among the UE pool, 4G RAN, 5G RAN, non-cellular AP, 4G EPC, and 5G core from the adaptive dynamic smart infrastructure control system of embodiments described with reference to FIG. 8.

The MANO in an embodiment may determine at block 908 whether it has received an instruction to adjust traffic loads at any 4G or 5G antennas. As described herein, the MANO may receive adjusted internetwork connectivity configurations defining adjustments to the distribution of traffic for the UE pool, among the 4G RAN, 5G RAN, non-cellular AP, 4G EPC, and 5G core. If these adjustments include an adjustment to the traffic loads at a 4G RAN antenna, such as may occur, for example, when an increasingly large proportion of the UEs within the pool are not 5G compliant, the method may proceed to block 910 to adjust the number of antennas at the enterprise mobile network (e.g., by increasing the number of 4G antennas) to meet the adjusted traffic load instruction. If these adjustments include an adjustment to the traffic loads at a 5G RAN antenna, such as may occur, for example, when an increasingly large proportion of the UEs within the pool are 5G compliant or in need of the higher throughput or lower latency available via the 5G communication standard, the method may proceed to block 912 to adjust the number of and location of gNodeB antennas (e.g., by increasing the number of 5G antennas) to meet the adjusted traffic load instruction.

At block 910, the MANO may adjust the number of 4G antennas activate at the enterprise mobile network to provide the adjusted internetwork connectivity configuration adjusting traffic loads at the 4G RAN antennas in an embodiment. For example, in an embodiment described with reference to FIG. 3, the MANO 320 may increase or decrease the number of active antennas (e.g., 362, 366, or 371) to adjust the uplink load across the plurality of active RRUs (e.g., 363, 367, or 372). The method may then proceed to block 914 to determine whether the MANO has received any further adjusted internetwork connectivity configuration instructions.

In an embodiment in which the MANO has received an instruction to adjust loads at the 5G RAN antennas, the MANO may adjust the number and location of 5G antennas that are activated to provide the adjusted internetwork connectivity configuration. For example, in an embodiment described with reference to FIG. 4, the MANO 474 or RIC 441 may increase or decrease the number of active antennas (e.g., 401, 402, or 405) to adjust the uplink load across the plurality of active RUs (e.g., 403 and 406). In some embodiments, the adjusted infrastructure component configuration output by the adaptive dynamic smart wireless infrastructure control system 475 may specifically identify additional antennas to bring online based on the geographic locations of UEs within pool 490. The method may then proceed to block 914 to determine whether the MANO has received any further adjusted internetwork connectivity configuration instructions.

At block 914, the MANO in an embodiment may determine whether it has received an adjustment to the traffic loads at a RAN network switch from the adaptive dynamic smart infrastructure control system. For example, in an embodiment described with reference to FIG. 3, the adaptive dynamic smart wireless infrastructure control system 321 may transmit instructions to the MANO 320 to perform an adjustment to traffic load at a specific network switch of the 4G RAN 360 (e.g., illustrating a potential bottleneck in data packet transmission that may be remedied by adjusting the flow of traffic). More specifically, the adjusted internet connectivity configuration in one example may indicate a need to decrease network load at one or more of BBUs (e.g., 365, 369, or 374) connecting the 4G RAN 360 to the 4G EPC 350. As another example, in an embodiment described with reference to FIG. 4, the adjusted internet connectivity configuration may indicate a need to decrease network load at DU 412 connecting the 4G eNodeB 408 of the 4G RAN to the DU 412 of the 5G RAN 480. In another example, the adjusted internet connectivity configuration may indicate a need to decrease network load at CU-C 433 connecting the 5G RAN 480 to the control plane (e.g., AMF 471) of the 5G core 470 or to decrease network load the load on CU-U 431 connecting the 5G RAN 480 to the user plane (e.g., UPF 472) of the 5G core 470. If the adjusted internet connectivity configuration indicates a need to decrease network load at a specific network switch, the method may proceed to block 916 for rerouting of wireless traffic. If the adjusted internet connectivity configuration does not indicate a need to decrease network load at a specific network switch, the method may proceed to block 918 to determine whether the MANO has received any further adjusted internetwork connectivity configuration instructions.

The MANO may reroute or redistribute traffic from wireless links with the UE pool based on adjusted internetwork connectivity configurations indicating a need to decrease network load at a specific network switch of a RAN in an embodiment at block 916. For example, in an embodiment described with reference to FIG. 3 in which the adjusted internet connectivity configuration indicates a need to decrease network load at one or more of BBUs (e.g., 365, 369, or 374) connecting the 4G RAN 360 to the 4G EPC 350, the MANO 320 may redirect traffic from one or more UEs in the pool 490 transceiving data through the 4G RAN 360 to connect to the 4G EPC 350 via the AP 330. The MANO 320 may identify one or more APs (e.g., 330) capable of establishing communication with the 4G EPC 350 and one or more specifically identified UEs in the pool 340. In such an embodiment, the MANO 320 may initiate or instruct those specifically identified UEs in the pool 340 to terminate their wireless links with the 4G RAN 360 and to establish wireless links with the AP 330 and the 4G EPC 350. This may be achieved, at least in part, by the MANO 320 adjusting the policies for each of these specifically identified UEs at the HSS 312 to prioritize wireless links with the AP 330 over wireless link with the 4G RAN 360.

In another example, in which the adjusted internet connectivity configuration indicates a need to decrease network load at CU-C 433 connecting the 5G RAN 480 to the control plane (e.g., AMF 471) of the 5G core 470 or to decrease network load the load on CU-U 431 connecting the 5G RAN 480 to the user plane (e.g., UPF 472) of the 5G core 470, the MANO 474 may redirect traffic being transceived to the 5G core 470 by the 5G RAN 480 by instructing some UEs in pool 490 transceiving data through the CU-U 431 and CU-C 433 to transceive data to the 5G core 470 via a non-cellular AP, rather than through the 5G RAN 480. As described with reference to FIG. 5, this may be achieved by the MANO 520 identifying one or more APs (e.g., 501) capable of establishing communication with the 5G core 570 and one or more specifically identified UEs in the pool 590. In such an embodiment, the MANO 520 may initiate or instruct those specifically identified UEs in the pool 590 to terminate their wireless links with the 5G RAN 580 and to establish communication with the 5G core 570 via the AP 501. This may be achieved, at least in part, by the MANO 520 adjusting the policies for each of these specifically identified UEs at the UDR 506 via the PCF 562 to prioritize wireless links with the AP 501 over wireless link with the 5G RAN 580. The method may then proceed to block 918 to determine whether the MANO has received any further adjusted internetwork connectivity configuration instructions.

At block 918, the MANO may determine whether it has received an adjustment to any loads at a 4G EPC network switch from the adaptive dynamic smart infrastructure control system. For example, in an embodiment described with reference to FIG. 3, the adaptive dynamic smart wireless infrastructure control system 321 may transmit instructions to the MANO 320 to perform an adjustment to traffic load at the S-GW 303 or the P-GW 305 of the 4G EPC 350. If the adjusted internet connectivity configuration indicates a need to decrease network load at a specific network switch of the 4G EPC, the method may proceed to block 920 for rerouting of wireless traffic. If the adjusted internet connectivity configuration does not indicate a need to decrease network load at a specific network switch of the 4G EPC, the method may proceed to block 922 to determine whether the MANO has received any further adjusted internetwork connectivity configuration instructions.

The MANO may reroute or redistribute traffic from wireless links with the UE pool based on adjusted internetwork connectivity configurations indicating a need to decrease network load at a specific network switch in the 4G EPC in an embodiment at block 918. For example, in an embodiment described with reference to FIG. 3 in which the adjusted internet connectivity configuration indicates a need to decrease network load at S-GW 303 connecting the 4G RAN 360 to 4G EPC 350 or P-GW 305 connecting the 4G EPC 350 to a remote cloud network 380 or MEC resources, the MANO 320 may redirect traffic being transceived to the 4G EPC 350 by the 4G RAN 360 by instructing the 4G RAN 360 to transceive data through the 5G core instead of the 4G EPC 350. The method may then proceed to block 922 to determine whether the MANO has received any further adjusted internetwork connectivity configuration instructions.

At block 922, the MANO may determine whether it has received an adjustment to any loads at a 5G core network switch from the adaptive dynamic smart infrastructure control system. For example, in an embodiment described with reference to FIG. 4, the adaptive dynamic smart wireless infrastructure control system 321 may transmit instructions to the MANO 320 indicating a need to decrease network load at DU 412 connecting the 4G eNodeB 408 of the 4G RAN to the DU 412 of the 5G RAN 480. If the adjusted internet connectivity configuration indicates a need to decrease network load at a specific network switch of the 5G core, the method may proceed to block 924 for rerouting of wireless traffic. If the adjusted internet connectivity configuration does not indicate a need to decrease network load at a specific network switch of the 5G core, all received adjusted infrastructure component configuration instructions and adjusted internetwork connectivity configurations may have been executed, and the method may then end.

The MANO may reroute or redistribute traffic from wireless links with the UE pool based on adjusted internetwork connectivity configurations indicating a need to decrease network load at a specific network switch in the 5G core in an embodiment at block 924. For example, in an embodiment described with reference to FIG. 4, in which the adjusted internet connectivity configuration indicates a need to decrease network load at DU 412 connecting the 4G eNodeB 408 of the 4G RAN to the DU 412 of the 5G RAN 480, the MANO 474 may redirect traffic from one or more UEs in the pool 490 transceiving data through DU 412 to connect to the 4G EPC via the 4G eNodeB 408 rather than the 5G core 470. All received adjusted infrastructure component configuration instructions and adjusted internetwork connectivity configurations may have been executed, and the method may then end.

The blocks of the flow diagrams of FIGS. 6 through 8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of an enterprise mobile network Management and Orchestration Module (MANO) comprising:
   a processor executing code instructions of an adaptive dynamic smart wireless infrastructure control system with a trained, multi-layer feed-forward neural network to:
      input performance metrics and performance requirements describing a performance gap between processing capabilities at an enterprise mobile network that includes a Multi-Access Edge Computing platform (MEC), a plurality of Radio Access Networks (RANs), a plurality of cellular network cores, and a plurality of non-cellular access points (APs) and detected processing requirements to service a plurality of wireless links between a pool of user equipment devices (UEs) and the enterprise mobile network;
      input connectivity metrics and requirements describing a connectivity gap between measured and required minimum Quality of Service values for a plurality of wireless links between the pool of user equipment devices (UEs) and the enterprise mobile network;
      output an adjusted infrastructure component configuration and an adjusted internetwork connectivity configuration for infrastructure components in the enterprise mobile network predicted to minimize the performance gap and the connectivity gap; and
   the processor executing code instructions of the MANO to adjust a distribution of computing resources across the enterprise mobile network, according to the adjusted infrastructure component configuration that includes an adjusted replication rate and adjusted processor call priority for a plurality of network functions (NFs) of a 5G core within the plurality of cellular network cores, and to adjust a distribution of communication traffic from the pool of UEs across the infrastructure components of the enterprise mobile network according to the adjusted internetwork connectivity configuration.

2. The information handling system of claim 1, wherein the performance requirements describe a guaranteed bitrate for the plurality of network cores and the plurality of RANs.

3. The information handling system of claim 1, wherein the connectivity metrics describe Quality of Service (QoS) measurements for wireless links between the pool of UEs and the plurality of RANs and the plurality of non-cellular APs.

4. The information handling system of claim 1, wherein the performance metrics describe processor utilization rates, traffic loads on a plurality of network switches operably connecting the plurality of cellular network cores to the plurality of RANs and to the plurality of APs, and loads on a plurality of network interface devices at the plurality of RANs.

5. The information handling system of claim 1, wherein the infrastructure component configurations describe distribution of computing resources across core containerized software applications executed at the plurality of cellular network cores and RAN containerized software applications executed at the plurality of RANs.

6. The information handling system of claim 1, wherein the internetwork connectivity configurations describe distribution of communication traffic across the plurality of cellular network cores, the plurality of RANs, the pool of UEs, and the plurality of non-cellular APs.

7. The information handling system of claim 1, wherein the infrastructure component configurations describe an increase in MEC processor availability to the plurality of RANs, and the plurality of cellular network cores.

8. A method of adaptively and dynamically adjusting infrastructure of an enterprise mobile network, comprising:
inputting into a trained, multi-layer feed-forward neural network, via a processor, performance metrics and performance requirements describing a performance gap between processing capabilities at an enterprise mobile network that includes a Multi-Access Edge Computing platform (MEC), a plurality of Radio Access Networks (RANs), a plurality of cellular network cores, and a plurality of non-cellular access points (APs) and RAN and wireless core requirements for establishing a plurality of wireless links between a pool of user equipment devices (UEs) and the enterprise mobile network;
inputting connectivity metrics and requirements describing a connectivity gap between measured and required minimum Quality of Service values for a plurality of wireless links between a pool of user equipment devices (UEs) and the enterprise mobile network;
outputting an adjusted infrastructure component configuration and an adjusted internetwork connectivity configuration predicted to minimize the performance gap and the connectivity gap;
adjusting, via a Management and Orchestration Module (MANO), a distribution of computing resources across the enterprise mobile network, according to the adjusted infrastructure component configuration by adjusting a load at a plurality of 5G network antennas of a 5G RAN and adjusting a number of the plurality of 5G network antennas currently active; and
adjusting a distribution of communication traffic from the pool of UEs across infrastructure components of the enterprise mobile network according to the adjusted internetwork connectivity configuration.

9. The method of claim 8 further comprising:
instructing the MANO to adjust the internetwork connectivity configuration by adjusting a load at a plurality of 4G network antennas of a 4G RAN; and
adjusting a number of the plurality of 4G network antennas currently active, via the MANO.

10. The method of claim 8 further comprising:
instructing the MANO to adjust the internetwork connectivity configuration by adjusting an adjusted replication rate and adjusted processor call priority for a plurality of network functions (NFs) of a 5G core within the plurality of cellular network cores.

11. The method of claim 8 further comprising:
instructing the MANO to adjust the internetwork connectivity configuration by adjusting a traffic load at a network switch operably connecting a first of the plurality of RANs to one of the plurality of cellular network cores; and
redirecting network traffic, via the MANO, to access the one of the plurality of cellular network cores via a second of the plurality of RANs or via one of the plurality of non-cellular APs.

12. The method of claim 8 further comprising:
instructing the MANO to adjust the internetwork connectivity configuration by adjusting a traffic load at a network switch operably connecting a first of a plurality of cellular network cores to one of a plurality of RANs; and
redirecting network traffic, via the MANO, to access a second of the plurality of cellular network cores via the one of the plurality of RANs.

13. The method of claim 8 further comprising:
instructing the MANO to adjust the infrastructure component configuration by decreasing MEC processor availability to one of the plurality of RANs.

14. The method of claim 8 further comprising:
instructing the MANO to adjust the infrastructure component configuration by decreasing MEC processor availability to one of the plurality of cellular network cores.

15. An information handling system of an enterprise mobile network Management and Orchestration Module (MANO) comprising:
a processor executing code instructions of an adaptive dynamic smart wireless infrastructure control system trained, multi-layer feed-forward neural network to:
input performance metrics and performance requirements describing a performance gap between processing capabilities and requirements at an enterprise mobile network that includes a Multi-Access Edge Computing platform (MEC), a plurality of Radio Access Networks (RANs), a plurality of cellular network cores, and a plurality of non-cellular access points (APs);
input connectivity metrics and requirements describing a connectivity gap between measured and required minimum Quality of Service values for a plurality of wireless links between a pool of user equipment devices (UEs), and the enterprise mobile network;
output an adjusted infrastructure component configuration and an adjusted internetwork connectivity configuration predicted to minimize the performance gap and the connectivity gap;
the neural network modelling a relationship between the performance metrics and performance requirements, connectivity metrics and requirements, infrastructure component configurations, and internetwork connectivity configurations; and
the processor executing code instructions of the MANO to adjust a distribution of computing resources across the enterprise mobile network, according to the adjusted infrastructure component configuration that includes an adjusted replication rate and adjusted processor call priority for a switch for a RAN of the plurality of RANs or for a cellular network core of the plurality of cellular network cores, and to adjust a distribution of communication traffic across the pool of UEs, and the enterprise mobile network according to the adjusted inter-network connectivity configuration.

16. The information handling system of claim 15, wherein the adjusted infrastructure component configuration comprises the adjusted replication rate and the adjusted processor call priority for the switch that is a base band unit (BBU) of a 4G RAN within the plurality of RANs.

17. The information handling system of claim 15, wherein the adjusted infrastructure component configuration comprises the adjusted replication rate and the adjusted processor call priority for the switch that is a distributed unit (DU) of a 5G RAN within the plurality of RANs.

18. The information handling system of claim 15, wherein the adjusted infrastructure component configuration comprises the adjusted replication rate and the adjusted processor call priority the switch that is a serving gateway (S-GW) or a packet data network gateway (P-GW) of a 4G Evolved Packet Core (EPC) within the plurality of cellular network cores.

19. The information handling system of claim 15, wherein the adjusted infrastructure component configuration comprises the adjusted replication rate and the adjusted processor call priority for the switch that switches a plurality of network functions (NFs) of a 5G core within the plurality of cellular network cores.

20. The information handling system of claim 15, wherein the adjusted infrastructure component configuration comprises the adjusted replication rate and the adjusted processor call priority for the switch that switches a user plane function of a 5G core within the plurality of cellular network cores.

* * * * *